(12) United States Patent
Nyberg et al.

(10) Patent No.: US 10,396,567 B2
(45) Date of Patent: Aug. 27, 2019

(54) WIRELESS ELECTRIC FIELD POWER TRANSFER SYSTEM, METHOD, TRANSMITTER AND RECEIVER THEREFOR

(71) Applicant: Solace Power Inc., Mount Pearl (CA)

(72) Inventors: Magnus Nyberg, Mount Pearl (CA); Andrew Bartlett, St. Johns (CA)

(73) Assignee: SOLACE POWER INC., Mount Pearl, NL (CA)

( * ) Notice: Subject to any disclaimer, the term of this patent is extended or adjusted under 35 U.S.C. 154(b) by 0 days.

(21) Appl. No.: 15/973,739

(22) Filed: May 8, 2018

(65) Prior Publication Data

US 2018/0262015 A1    Sep. 13, 2018

Related U.S. Application Data

(63) Continuation of application No. 14/846,152, filed on Sep. 4, 2015, now Pat. No. 9,979,206.

(Continued)

(51) Int. Cl.
| | |
|---|---|
| *H02J 5/00* | (2016.01) |
| *B64C 27/04* | (2006.01) |
| *H02J 7/02* | (2016.01) |
| *H02J 17/00* | (2006.01) |
| *H01F 38/14* | (2006.01) |
| *H02J 50/10* | (2016.01) |
| *H02J 7/00* | (2006.01) |
| *H02J 50/05* | (2016.01) |

(Continued)

(52) U.S. Cl.
CPC ............. *H02J 5/005* (2013.01); *B64C 27/04* (2013.01); *H01F 38/14* (2013.01); *H02J 7/0042* (2013.01); *H02J 7/025* (2013.01); *H02J 17/00* (2013.01); *H02J 50/05* (2016.02); *H02J 50/10* (2016.02); *B64C 27/32* (2013.01); *H02J 50/90* (2016.02)

(58) Field of Classification Search
None
See application file for complete search history.

(56) References Cited

U.S. PATENT DOCUMENTS

| | | |
|---|---|---|
| 3,876,980 A | 4/1975 | Haemmig et al. |
| 3,984,807 A | 10/1976 | Haemmig |
| (Continued) | | |

FOREIGN PATENT DOCUMENTS

| | | |
|---|---|---|
| AU | 2011232776 A1 | 10/2011 |
| CN | 101416411 A | 4/2009 |
| (Continued) | | |

OTHER PUBLICATIONS

Office Action for corresponding European Application No. 12829237.2 dated Aug. 20, 2015.

(Continued)

*Primary Examiner* — Jeffery S Zweizig
(74) *Attorney, Agent, or Firm* — Harness, Dickey & Pierce, P.L.C.

(57) ABSTRACT

A wireless power transfer system comprises: a transmitter comprising a transmit electrode set configured to transfer power via resonant electric field coupling; and a receiver comprising a receive electrode set configured to extract the transferred power via resonant electric field coupling, wherein the electrodes of at least one of the transmit and receive electrode sets are concentric.

28 Claims, 38 Drawing Sheets

226

Related U.S. Application Data

(60) Provisional application No. 62/046,830, filed on Sep. 5, 2014.

(51) Int. Cl.
*B64C 27/32* (2006.01)
*H02J 50/90* (2016.01)

(56) References Cited

U.S. PATENT DOCUMENTS

| | | | |
|---|---|---|---|
| 4,034,298 A | 7/1977 | McFadyen et al. | |
| 4,083,003 A | 4/1978 | Haemmig | |
| 4,757,290 A | 7/1988 | Keren | |
| 4,805,232 A | 2/1989 | Ma | |
| 4,821,291 A | 4/1989 | Stevens et al. | |
| 5,061,910 A | 10/1991 | Bouny | |
| 5,437,057 A | 7/1995 | Richley et al. | |
| 5,557,290 A | 9/1996 | Watanabe | |
| 5,621,323 A | 4/1997 | Larsen | |
| 5,701,121 A | 12/1997 | Murdoch | |
| 5,990,632 A | 11/1999 | Smith et al. | |
| 6,194,993 B1 | 2/2001 | Hayashi et al. | |
| 6,570,457 B2 | 5/2003 | Fischer | |
| 6,579,235 B1 | 6/2003 | Abita et al. | |
| 6,591,139 B2 | 7/2003 | Loftin et al. | |
| 6,608,291 B1 | 8/2003 | Collins et al. | |
| 6,879,809 B1 | 4/2005 | Vega et al. | |
| 7,356,952 B2 | 4/2008 | Sweeney et al. | |
| 7,519,328 B2 | 4/2009 | Dokai et al. | |
| 7,567,824 B2 | 7/2009 | Mickle et al. | |
| 7,595,732 B2 | 9/2009 | Shameli et al. | |
| 7,668,528 B2 | 2/2010 | Rofougaran et al. | |
| 7,825,543 B2 | 11/2010 | Karalis et al. | |
| 7,915,874 B1 | 3/2011 | Cuk | |
| 7,925,308 B2 | 4/2011 | Greene et al. | |
| 8,024,012 B2 | 9/2011 | Clevenger et al. | |
| 8,035,255 B2 | 10/2011 | Kurs et al. | |
| 8,061,864 B2 | 11/2011 | Metcalf et al. | |
| 8,076,801 B2 | 12/2011 | Karalis et al. | |
| 8,121,540 B1 | 2/2012 | Johnson et al. | |
| 8,169,185 B2 | 5/2012 | Partovi et al. | |
| 8,294,300 B2 | 10/2012 | Cook et al. | |
| 8,305,217 B2 | 11/2012 | Arimura | |
| 8,487,478 B2 | 7/2013 | Kirby et al. | |
| 8,517,126 B2 | 8/2013 | Atarashi | |
| 8,536,739 B2 * | 9/2013 | Ichikawa | H02J 7/025 307/104 |
| 8,829,728 B2 | 9/2014 | Yamamoto et al. | |
| 8,878,393 B2 | 11/2014 | Kirby et al. | |
| 8,922,066 B2 | 12/2014 | Kesler et al. | |
| 8,933,589 B2 | 1/2015 | Bourilkov et al. | |
| 8,987,941 B2 | 3/2015 | Ichikawa | |
| 9,054,745 B2 | 6/2015 | Moon et al. | |
| 9,142,998 B2 | 9/2015 | Yu et al. | |
| 9,161,160 B2 | 10/2015 | Ikemoto et al. | |
| 9,172,276 B2 | 10/2015 | Ichikawa et al. | |
| 2002/0097107 A1 | 7/2002 | Burns et al. | |
| 2002/0160722 A1 | 10/2002 | Terranova et al. | |
| 2003/0233288 A1 | 12/2003 | Sweeney et al. | |
| 2004/0140941 A1 | 7/2004 | Joy et al. | |
| 2005/0007067 A1 | 1/2005 | Baarman et al. | |
| 2005/0143023 A1 | 6/2005 | Shih | |
| 2006/0113955 A1 | 6/2006 | Nunally | |
| 2006/0205381 A1 | 9/2006 | Beart et al. | |
| 2006/0281435 A1 | 12/2006 | Shearer et al. | |
| 2007/0010295 A1 | 1/2007 | Greene et al. | |
| 2007/0164414 A1 | 7/2007 | Dokai et al. | |
| 2007/0191075 A1 | 8/2007 | Greene et al. | |
| 2007/0222542 A1 | 9/2007 | Joannopoulos et al. | |
| 2008/0202003 A1 | 8/2008 | Sweeney et al. | |
| 2008/0211320 A1 | 9/2008 | Cook et al. | |
| 2008/0265684 A1 | 10/2008 | Farkas | |
| 2009/0045772 A1 | 2/2009 | Cook et al. | |
| 2009/0058189 A1 | 3/2009 | Cook et al. | |
| 2009/0102663 A1 | 4/2009 | Hillegass | |
| 2009/0134712 A1 | 5/2009 | Cook et al. |
| 2009/0160261 A1 | 6/2009 | Elo |
| 2009/0206675 A1 | 8/2009 | Camurati et al. |
| 2009/0218884 A1 | 9/2009 | Soar |
| 2009/0243397 A1 | 10/2009 | Cook et al. |
| 2009/0251008 A1 | 10/2009 | Sugaya |
| 2009/0284082 A1 | 11/2009 | Mohammadian |
| 2009/0284083 A1 | 11/2009 | Karalis et al. |
| 2009/0299918 A1 | 12/2009 | Cook et al. |
| 2009/0302690 A1 | 12/2009 | Kubono et al. |
| 2009/0303693 A1 | 12/2009 | Mao |
| 2010/0045114 A1 | 2/2010 | Sample et al. |
| 2010/0081379 A1 | 4/2010 | Cooper et al. |
| 2010/0109445 A1 | 5/2010 | Kurs et al. |
| 2010/0148723 A1 | 6/2010 | Cook et al. |
| 2010/0161004 A1 | 6/2010 | Najafi et al. |
| 2010/0192444 A1 | 8/2010 | Cabahug et al. |
| 2010/0201189 A1 | 8/2010 | Kirby et al. |
| 2010/0201312 A1 | 8/2010 | Kirby et al. |
| 2010/0210233 A1 | 8/2010 | Cook et al. |
| 2010/0256481 A1 | 10/2010 | Mareci et al. |
| 2010/0277121 A1 | 11/2010 | Hall et al. |
| 2011/0018498 A1 | 1/2011 | Soar |
| 2011/0057742 A1 | 3/2011 | Frye et al. |
| 2011/0084656 A1 | 4/2011 | Gao |
| 2011/0090030 A1 | 4/2011 | Pagani |
| 2011/0109167 A1 | 5/2011 | Park et al. |
| 2011/0121658 A1 | 5/2011 | Fukada |
| 2011/0140429 A1 | 6/2011 | Bohori et al. |
| 2011/0169338 A1 | 7/2011 | Kozakai |
| 2011/0198939 A1 | 8/2011 | Karalis et al. |
| 2011/0234019 A1 | 9/2011 | Camurati et al. |
| 2011/0235800 A1 | 9/2011 | Furukawa et al. |
| 2011/0241436 A1 | 10/2011 | Furukawa |
| 2011/0266881 A1 | 11/2011 | Kim et al. |
| 2011/0266995 A1 | 11/2011 | Winfield et al. |
| 2011/0267127 A1 | 11/2011 | Staszewski et al. |
| 2011/0281535 A1 | 11/2011 | Low et al. |
| 2011/0316347 A1 | 12/2011 | Endo et al. |
| 2012/0001485 A1 | 1/2012 | Uchida |
| 2012/0001496 A1 | 1/2012 | Yamamoto et al. |
| 2012/0001497 A1 | 1/2012 | Sada et al. |
| 2012/0010079 A1 | 1/2012 | Sedwick |
| 2012/0019057 A9 | 1/2012 | Kirby et al. |
| 2012/0043887 A1 | 2/2012 | Mesibov |
| 2012/0049645 A1 | 3/2012 | Kozakai |
| 2012/0056485 A1 | 3/2012 | Haruyama |
| 2012/0056579 A1 | 3/2012 | Kim et al. |
| 2012/0062039 A1 | 3/2012 | Kamata et al. |
| 2012/0062174 A1 | 3/2012 | Kamata |
| 2012/0068548 A1 | 3/2012 | Endo et al. |
| 2012/0095531 A1 | 4/2012 | Derbas et al. |
| 2012/0098330 A1 | 4/2012 | Ichikawa et al. |
| 2012/0104997 A1 | 5/2012 | Carobolante |
| 2012/0146431 A1 | 6/2012 | Ichikawa et al. |
| 2012/0153733 A1 | 6/2012 | Schatz et al. |
| 2012/0161538 A1 | 6/2012 | Kinoshita et al. |
| 2012/0223586 A1 | 9/2012 | Gotani |
| 2013/0009488 A1 | 1/2013 | Choe et al. |
| 2013/0015699 A1 | 1/2013 | Mita |
| 2013/0147427 A1 | 6/2013 | Polu et al. |
| 2013/0187475 A1 | 7/2013 | Vendik et al. |
| 2013/0187598 A1 | 7/2013 | Park et al. |
| 2013/0260803 A1 | 10/2013 | Ikemoto et al. |
| 2014/0021907 A1 | 1/2014 | Yu et al. |
| 2014/0167525 A1 | 6/2014 | Van Goor et al. |
| 2014/0203663 A1 | 7/2014 | Waffenschmidt et al. |
| 2014/0327321 A1 | 11/2014 | Kusunoki et al. |
| 2014/0368056 A1 | 12/2014 | Hosotani |
| 2015/0002195 A1 | 1/2015 | Englekirk |
| 2015/0077197 A1 | 3/2015 | Kushita et al. |
| 2015/0102941 A1 | 4/2015 | Keech et al. |
| 2015/0249340 A1 | 9/2015 | Hashimoto et al. |
| 2015/0333538 A1 | 11/2015 | Kusunoki et al. |
| 2015/0333539 A1 | 11/2015 | Kusunoki et al. |
| 2015/0366441 A1 | 12/2015 | Tsuruta et al. |
| 2015/0372540 A1 | 12/2015 | Takahashi et al. |

(56) References Cited

U.S. PATENT DOCUMENTS

| | | |
|---|---|---|
| 2016/0099651 A1 | 4/2016 | Ishigaki |
| 2016/0308403 A1 | 10/2016 | Bluvshtein et al. |
| 2017/0140869 A1 | 5/2017 | Costanzo et al. |

FOREIGN PATENT DOCUMENTS

| | | |
|---|---|---|
| CN | 102104284 A | 6/2011 |
| DE | 10 2007 003458 A1 | 7/2008 |
| EP | 0558316 A1 | 9/1993 |
| JP | H03-85022 A | 4/1991 |
| JP | H06150079 A1 | 5/1994 |
| JP | 2001218371 A | 8/2001 |
| JP | 2007-243943 A | 9/2007 |
| JP | 2008193499 A | 8/2008 |
| JP | 2009296857 A | 12/2009 |
| JP | 2012039874 A | 2/2012 |
| JP | 2014-107883 A | 6/2014 |
| KR | 20120048306 A | 5/2012 |
| WO | WO-2009089146 A1 | 7/2009 |
| WO | WO-2010093719 A1 | 8/2010 |
| WO | WO-11077493 A1 | 6/2011 |
| WO | WO-2013033834 A1 | 3/2013 |
| WO | WO-2013/108893 A1 | 7/2013 |
| WO | WO-2014147714 A1 | 9/2014 |

OTHER PUBLICATIONS

New Zealand Examination Report for Application No. 623200 dated Aug. 5, 2015.
Office Action for corresponding Singapore Application No. 11201400409X dated Jun. 19, 2015.
Office Action for corresponding Singapore Application No. 11201400409X dated Nov. 28, 2014.
New Zealand Examination Report for Application No. 623200 dated Aug. 28, 2014.
"What is a Ground (Earth) Loop," Sound on Sound, Aug. 2006.
Jiang et al ("A Class-B Push-Pull Power Amplifier Based on an Extended Resonance Technique," IEEE Microwave and Wireless Components Letters, vol. 13, No. 12, Dec. 2003).
Motorola ("Motorola Razr v3i GSM," Motomanual, Motorola Inc. 2006, calculator: pp. 7, 79, 80, 104; GPRS p. 38; Radio reciever: p. 84, 88, 94, 95, 96).
"Electromagnetic Radiation and how it affects your instruments," Field Service Memo, May 1990, OSHA Cincinnati Laboratory.
International Search Report PCT/ISA/210 for International Application No. PCT/CA2015/050605 dated Sep. 11, 2015.
Written Opinion of the International Searching Authority PCT/ISA/237 for International Application No. PCT/CA2015/050605 dated Sep. 11, 2015.
Written Opinion of the International Searching Authority PCT/ISA/237 for International Application No. PCT/CA2015/050855 dated Nov. 5, 2015.
International Search Report PCT/ISA/210 for International Application No. PCT/SE2015/050855 dated Nov. 5, 2015.
Office Action for corresponding U.S. Appl. No. 13/607,474 dated Nov. 4, 2015.
Office Action for corresponding U.S. Appl. No. 13/607,474 dated May 8, 2015.
Office Action for corresponding U.S. Appl. No. 13/607,474 dated Dec. 5, 2014.
Office Action for corresponding Chinese Application No. 201280053727.5 dated Nov. 3, 2015 and English translation thereof.
Examination Report for corresponding New Zealand Application No. 623200 dated Jan. 18, 2016.
Written Opinion for corresponding Singapore Application No. 11201400409X dated Jan. 13, 2016.
Pre-Examination Notice for corresponding Australian Application No. 2012306994 dated Feb. 29, 2016.
Office Action for corresponding U.S. Appl. No. 13/607,474 dated Apr. 8, 2016.
Office Action for Australian Application No. 2012306994 dated Jul. 1, 2016.
Office Action for New Zealand Application No. 719870 dated Jun. 9, 2016.
International Search Report and Written Opinion for Application No. PCT/CA2016/050494 dated Jun. 20, 2016.
Office Action for corresponding New Zealand Application No. 719870 dated Sep. 13, 2016.
Office Action for corresponding Japanese Application No. 2014-528811 dated Aug. 16, 2016 and English translation thereof.
Office Action for corresponding U.S. Appl. No. 13/607,474 dated Oct. 18, 2016.
Office Action for corresponding U.S. Appl. No. 13/607,474 dated Dec. 16, 2016.
Notice of Allowance for corresponding U.S. Appl. No. 13/607,474 dated Feb. 15, 2017.
International Search Report and Written Opinion dated Jan. 10, 2013.
"Motomanual RAZR V3i GSM," Motorola.com, Motorola Inc., 2006.
Office Action for corresponding U.S. Appl. No. 14/747,588 dated May 8, 2017.
Office Action for corresponding U.S. Appl. No. 14/751,786 dated May 22, 2017.
Office Action for corresponding U.S. Appl. No. 14/846,152 dated Jun. 21, 2017.
New Zealand Examination Report for Application No. 731948 dated Jun. 23, 2017.
Office Action for corresponding U.S. Appl. No. 14/747,588 dated Sep. 28, 2017.
Office Action for corresponding U.S. Appl. No. 14/751,786 dated Oct. 12, 2017.
Office Action for corresponding U.S. Appl. No. 14/846,152 dated Nov. 14, 2017.
Singapore Search Report and Written Opinion for Application No. 11201610806Q dated Nov. 30, 2017.
Extended European Search Report for European Patent Application No. 15811214.4 dated Feb. 9, 2018.
Extended European Search Report for European Patent Application No. 15838917.1 dated Feb. 28, 2018.
Office Action for corresponding U.S. Appl. No. 14/747,588 dated Mar. 12, 2018.
Office Action for corresponding Japanese Application No. 2017-186809 dated Sep. 20, 2018 and English translation thereof.
Office Action for corresponding U.S. Appl. No. 15/474,396 dated Nov. 1, 2018.
Office Action for corresponding U.S. Appl. No. 14/747,588 dated Nov. 2, 2018.
Office Action for corresponding U.S. Appl. No. 14/747,588 dated Jul. 19, 2018.
Office Action for corresponding Canadian Patent Application No. 2788895 dated Mar. 19, 2019.
Extended European Search Report for European Patent Application No. 16788984.9 dated Nov. 15, 2018.

\* cited by examiner

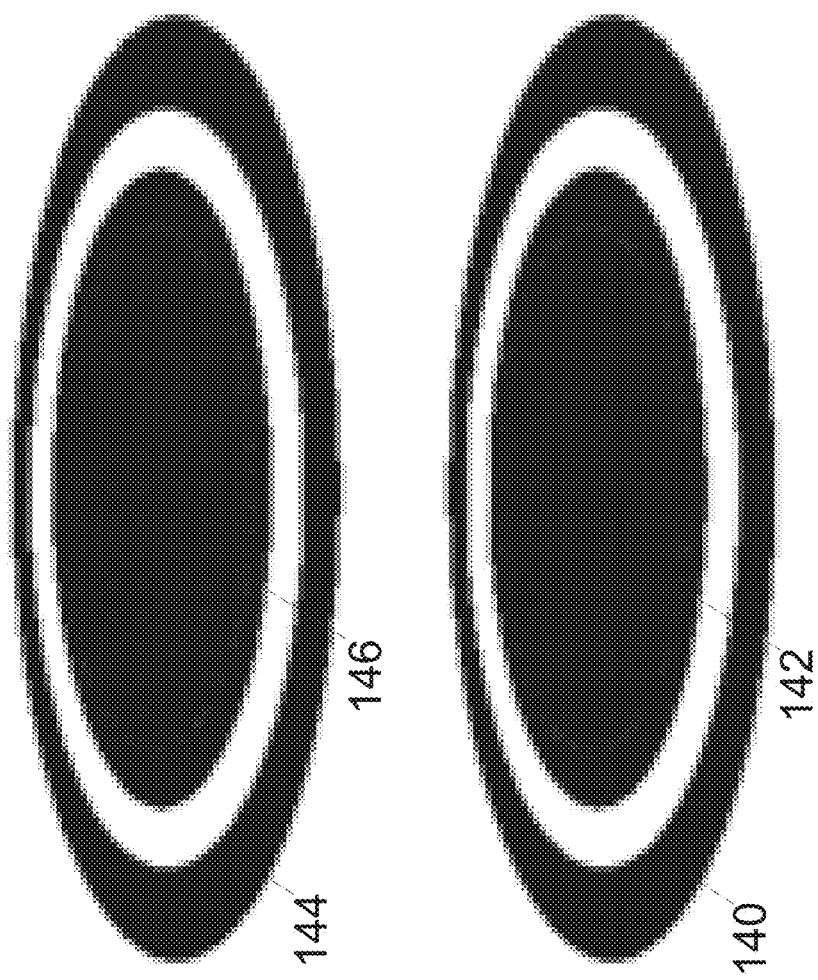

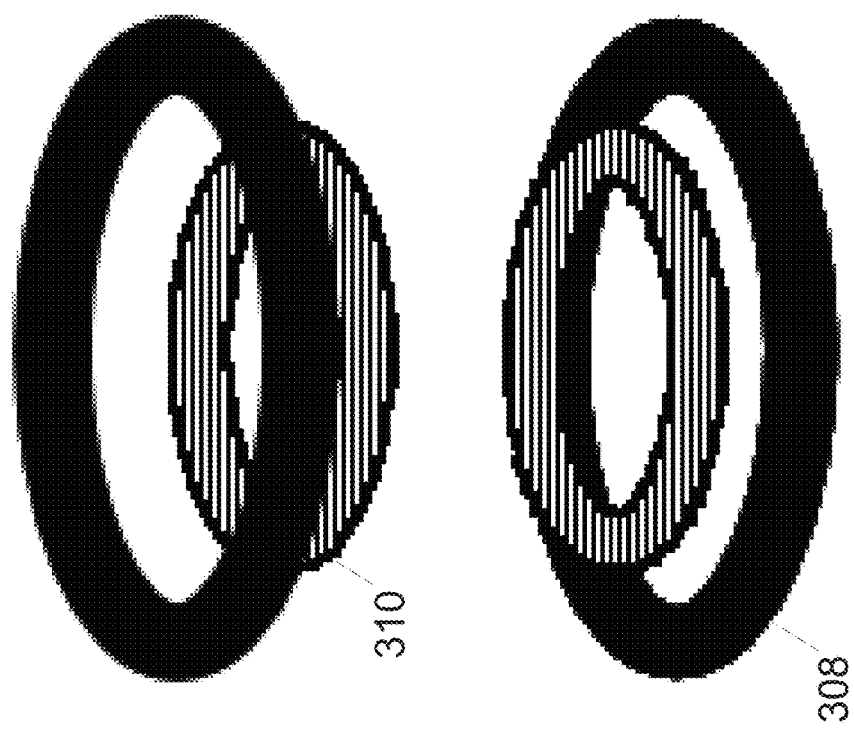

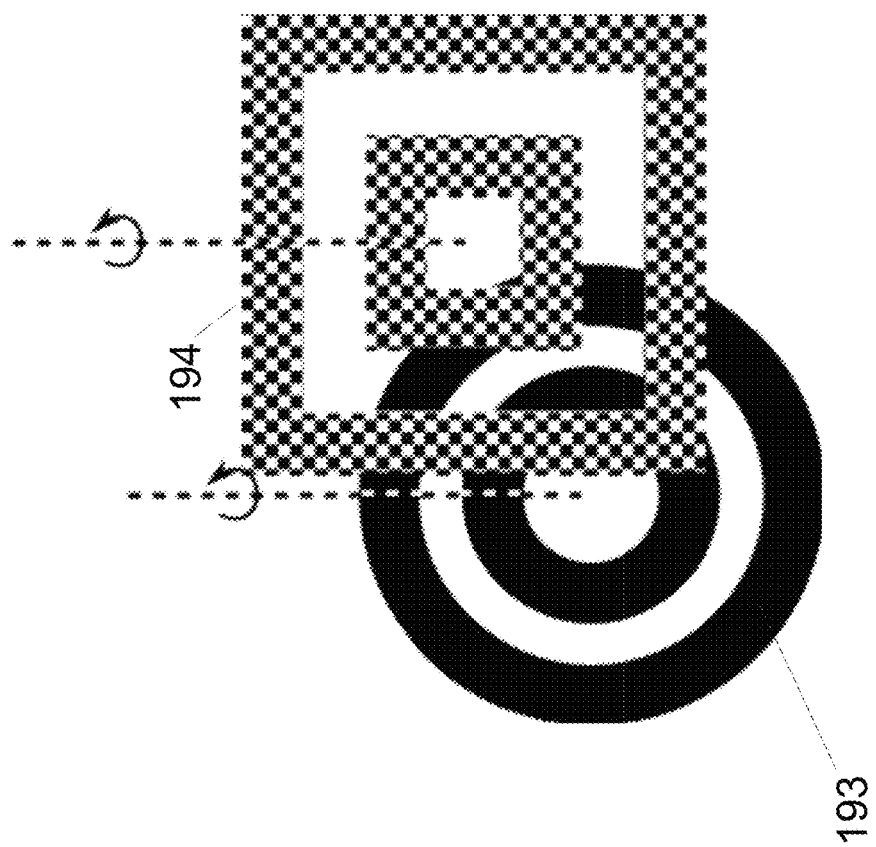

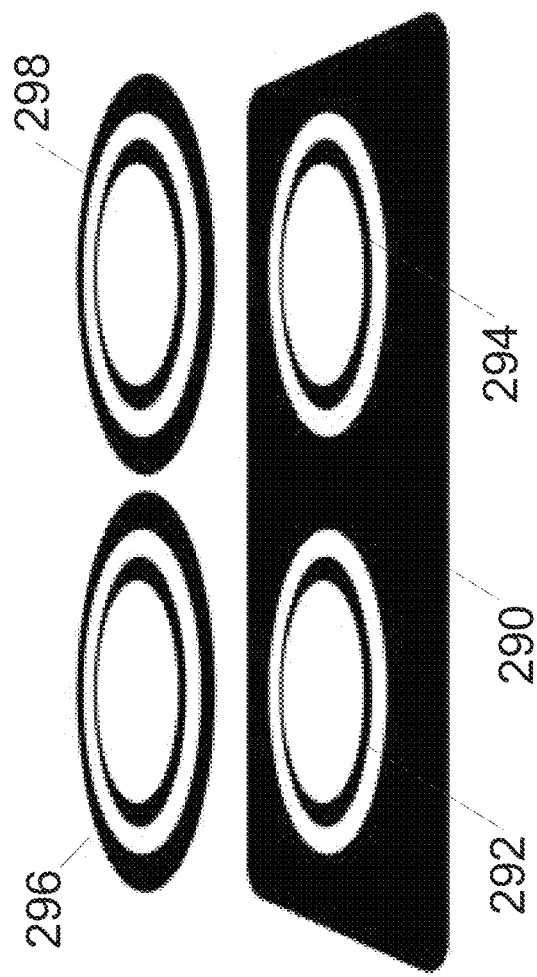

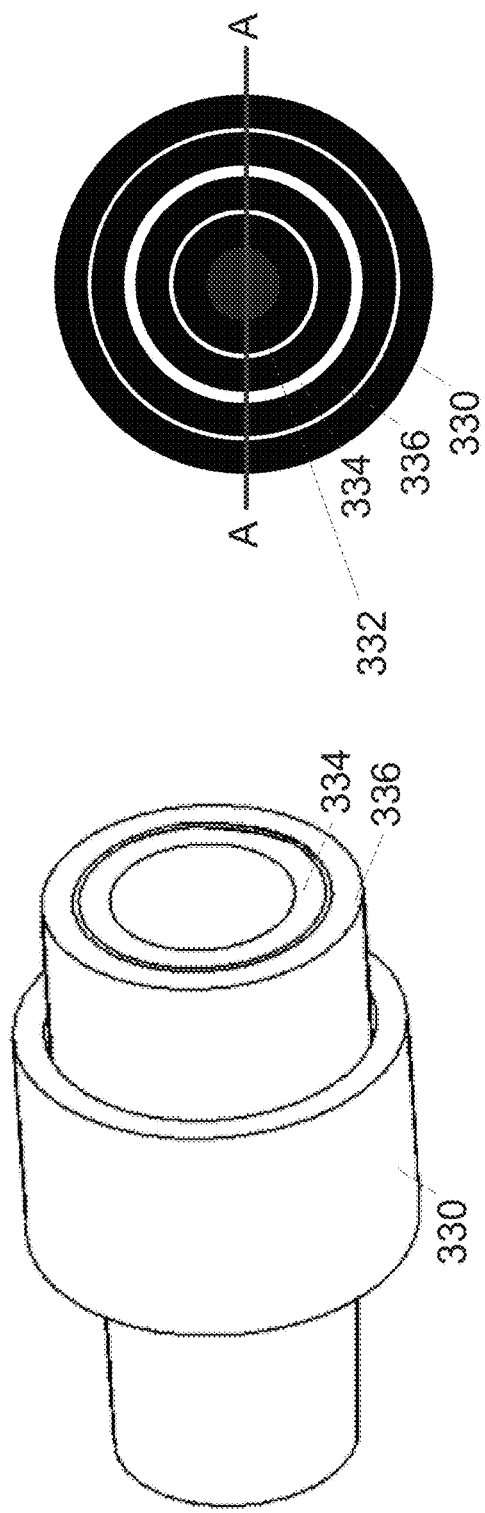
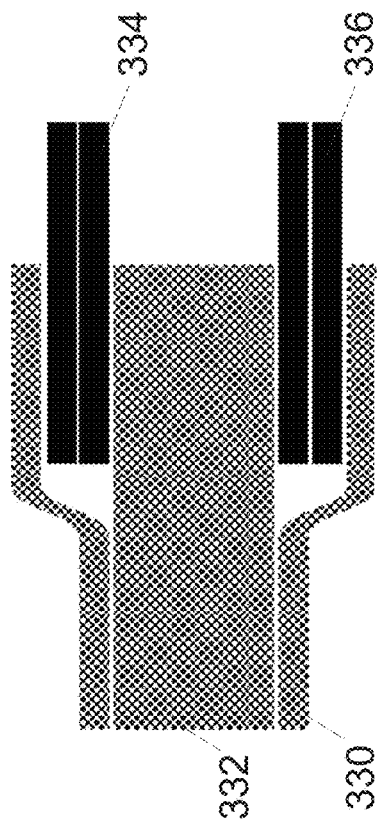
Figure 30b
Figure 30c
Figure 30a

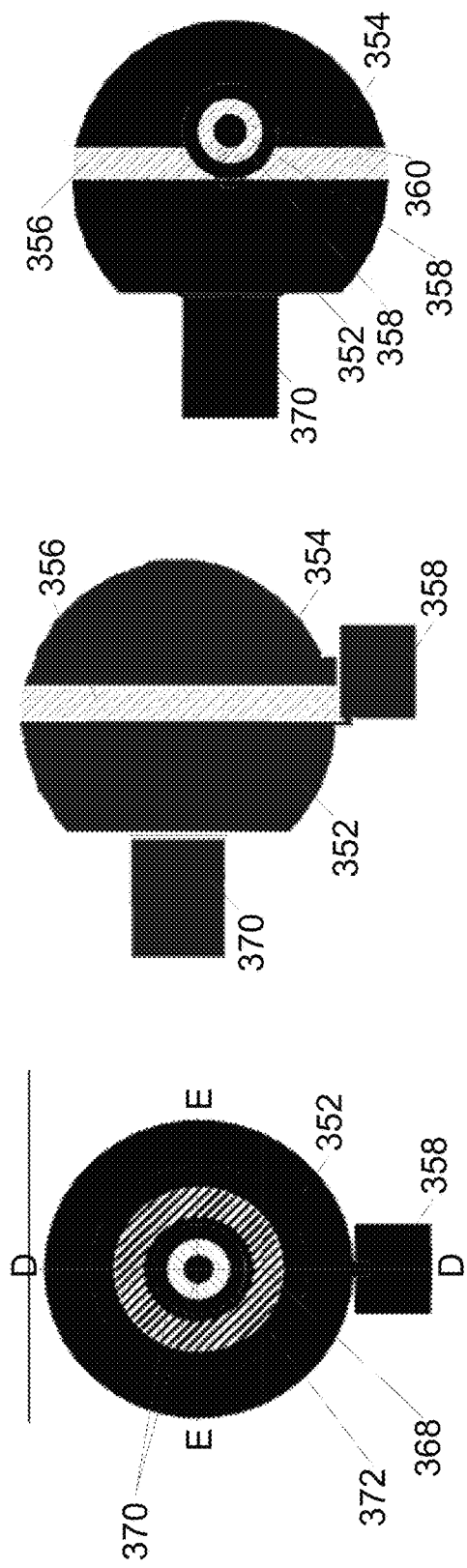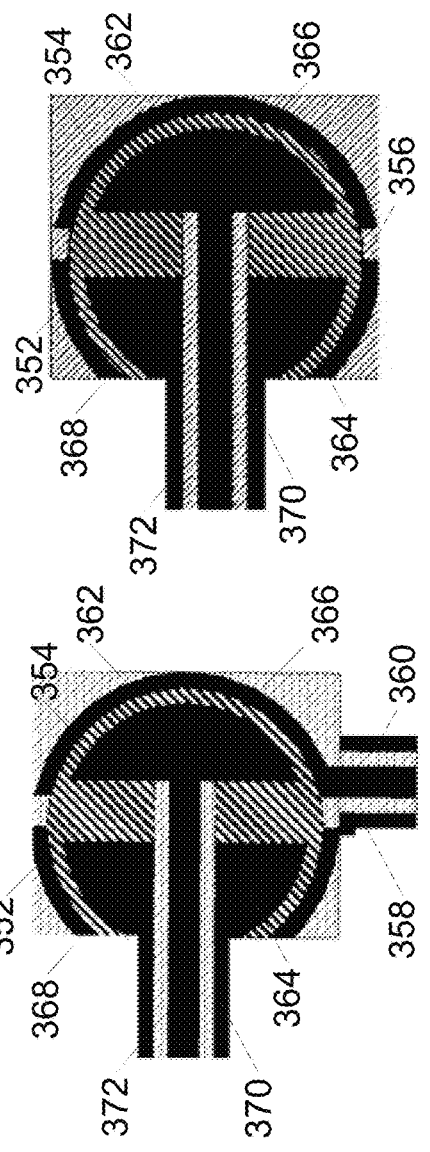

WIRELESS ELECTRIC FIELD POWER TRANSFER SYSTEM, METHOD, TRANSMITTER AND RECEIVER THEREFOR

CROSS REFERENCE TO RELATED APPLICATIONS

This U.S. non-provisional patent application is a continuation of U.S. application Ser. No. 14/846,152 filed on Sep. 4, 2015, which claims the benefit of U.S. Provisional Application No. 62/046,830 filed on Sep. 5, 2014, which is related to U.S. patent application Ser. No. 13/607,474 filed on Sep. 7, 2012 and U.S. patent application Ser. No. 14/751,786 filed on Jun. 26, 2015, the entire contents of each of which are incorporated herein by reference in their entirety.

FIELD

The subject application relates generally to wireless power transfer and in particular, to a wireless electric field power transfer system, a transmitter and receiver therefor and a method of wirelessly transferring power.

BACKGROUND

A variety of wireless power transfer systems are known. A typical wireless power transfer system consists of a power source electrically connected to a wireless power transmitter, and a wireless power receiver electrically connected to load.

In magnetic induction systems, the transmitter has an induction coil that transfers electrical energy from the power source to an induction coil of the receiver. The transferred electrical energy is then applied to the load. Power transfer occurs due to coupling of magnetic fields between the induction coils of the transmitter and receiver. The range of these magnetic induction systems is however, limited and the induction coils of the transmitter and receiver must be in optimal alignment for power transfer. Resonant magnetic systems, which transfer power due to coupling of magnetic fields between the induction coils of the transmitter and receiver also exist. In these resonant magnetic systems, the induction coils of the transmitter and receiver are resonated using high quality factor (high Q) capacitors. The range of power transfer in resonant magnetic systems is increased over that of magnetic induction systems and alignment issues are rectified.

In electrical field coupling systems, the transmitter and receiver have capacitive electrodes and power transfer occurs due to coupling of electric fields between the capacitive electrodes of the transmitter and receiver. Resonant electric field systems also exist in which the capacitive electrodes of the transmitter and receiver are made resonant using high quality factor (high Q) inductors. Similar to resonant magnetic systems, resonant electric field systems have an increased range of power transfer compared to that of non-resonant electric field systems and alignment issues are rectified.

Although wireless power transfer techniques are known, improvements are desired. It is therefore an object to provide a novel wireless electric field power transfer system, a transmitter and receiver therefor and a method of wirelessly transmitting power.

SUMMARY

Accordingly, in one aspect there is provided a wireless power transfer system comprising: a transmitter comprising a transmit electrode set configured to transfer power via resonant electric field coupling; and a receiver comprising a receive electrode set configured to extract the transferred power via resonant electric field coupling, wherein the electrodes of at least one of the transmit and receive electrode sets are concentric.

In one embodiment, the electrodes of both the transmit and receive electrode sets are concentric.

In another embodiment, electrodes of at least one of the transmit and receive electrode sets are coplanar.

In another embodiment, the electrodes of at least one of the transmit and receive electrode sets are segments of concentric electrodes.

In another embodiment, the electrodes of at least one of the transmit and receive electrode sets are azimuthally asymmetric.

In another embodiment, the plane defined by the electrodes of the transmit electrode set forms an angle with the plane defined by the electrodes of the receive electrode set in the range of 0 to 90 degrees.

In another embodiment, the transmit electrode set comprises two or more concentric electrodes.

In another embodiment, the receive electrode set comprises two or more concentric electrodes.

In another embodiment, an electrode of the transmit electrode set overlaps another electrode of the transmit electrode set, or an electrode of the receive electrode set overlaps another electrode of the receive electrode set.

In another embodiment, at least one electrode of at least one of the transmit and receive electrode sets is elliptical. In another embodiment, at least one electrode of at least one of the transmit and receive electrode sets is circular. In another embodiment, at least one electrode of at least one of the transmit and receive electrode sets is rectangular. In another embodiment, at least one electrode of at least one of the transmit and receive electrode sets is a disc. In another embodiment, at least one electrode of at least one of the transmit and receive electrode sets is a ring. In another embodiment, at least one electrode of at least one of the transmit and receive electrode sets is a frustum. In another embodiment, at least one electrode of one of the transmit and receive electrode sets is a plate. In another embodiment, the transmit electrode set comprises a tube and a rod, and wherein the receive electrode set comprises at least two tubes. In another embodiment, the transmit electrode set is axially offset from the receive electrode set. In another embodiment, the transmit electrode set comprises a first and second socket, and wherein the receive electrode set comprises a first and a second ball. In another embodiment, the transmit electrode set comprises a first and second outer spherical electrode, and wherein the receive electrode set comprises a first and second inner spherical electrode.

In another embodiment, the electrodes of the transmitter and the electrodes of the receiver are concentric.

In another embodiment, the transmit electrode set is axially offset from the receive electrode set.

In another embodiment, the system further comprises another receiver comprising another receive electrode set configured to extract the transferred power via resonant electric field coupling.

In another embodiment, the system further comprises an axle circumscribed by the transmit electrode set and the receive electrode set.

According to another aspect there is provided a transmitter comprising a transmit electrode set configured to transfer power via resonant electric field coupling, wherein the electrodes are concentric.

According to yet another aspect there is provided a receiver comprising a receive electrode set configured to extract power via resonant electric field coupling, wherein the electrodes are concentric.

According to still yet another aspect there is provided a helicopter comprising: a power source; a transmitter electrically connected to the power source, the transmitter comprising a transmit electrode set configured to transfer power received from the power source via resonant electric field coupling; a rotatable load; and a receiver electrically connected to the rotatable load, the receiver comprising a receive electrode set configured to extract the transferred power via resonant electric field coupling and deliver the extracted power to the load, wherein the electrodes of at least one of the transmit and receive electrode sets are concentric.

BRIEF DESCRIPTION OF THE DRAWINGS

Embodiments will now be described more fully with reference to the accompanying drawings in which:

FIG. 4b is a plan view of the transmit electrode set of FIG. 4a;

FIG. 9 is a perspective view of an embodiment of the electrodes of the system of FIG. 2;

FIG. 10b is a plan view of the electrodes of FIG. 10a;

FIG. 16c is a perspective view of another embodiment of the electrodes of the system of FIG. 2;

FIG. 19 is a plan view of another embodiment of the electrodes of the system of FIG. 2;

FIG. 26b is a perspective view of an embodiment of the electrodes of the system of FIG. 26a;

FIG. 30a is a perspective view of another embodiment of the electrodes of the system of FIG. 2;

FIG. 30b is a plan view of the electrodes of FIG. 30a;

FIG. 30c is a cross-sectional side elevation view of the electrodes of FIG. 30b taken along section line A-A;

FIG. 33a is a front elevation view of another embodiment of the electrodes of the system of FIG. 2;

FIG. 33b is a side elevation view of the electrodes of FIG. 33a;

FIG. 33c is a bottom plan view of the electrodes of FIG. 33a;

FIG. 33d is a cross-sectional side elevation view of the embodiment of FIG. 33a taken along sectional line D-D of FIG. 33a;

FIG. 33e is a cross-sectional bottom plan view of the embodiment of FIG. 34a taken along sectional line E-E of FIG. 33a;

FIG. 34b is a cross-sectional front elevation view of the electrodes of FIG. 34a;

DETAILED DESCRIPTION OF EMBODIMENTS

Figure 1:
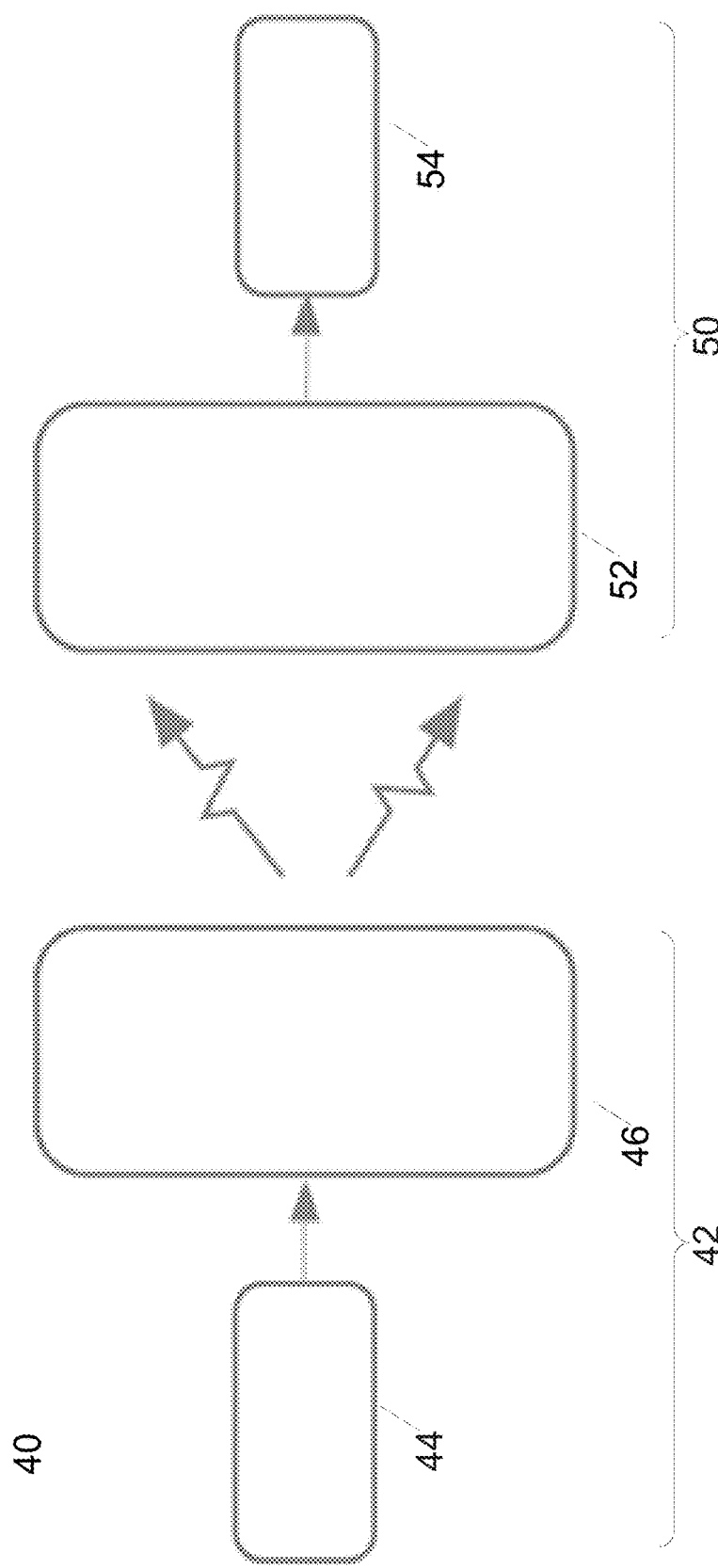
FIG. 1 is a generic block diagram of a wireless power transfer system.

Turning now to FIG. 1, a wireless power transfer system is shown and is generally identified by reference numeral 40. The wireless power transfer system 40 comprises a transmitter 42 and a receiver 50. The transmitter comprises a power source 44 electrically connected to a transmit resonator 46. The receiver 50 comprises a receive resonator 52 electrically connected to a load 54. Power is transferred from the power source 44 to the transmit resonator 46. The power is then transferred from the transmit resonator 46 to the receive resonator 52 via resonant electric field coupling, and then transferred from the receive resonator 52 to the load 54.

In one embodiment of the wireless power transfer system 40 described in the aforementioned U.S. patent application Ser. No. 14/751,786 which is incorporated by reference, the transmit resonator 46 comprises a transmit electrode set comprising a pair of laterally spaced, elongate capacitive transmit electrodes, each of which is electrically connected to the power source 44 via a high Q inductor. The receive resonator 52 comprises a receive electrode set comprising a pair of laterally spaced, elongate capacitive receive electrodes, each of which is electrically connected to the load 54 via a high Q inductor. During operation, power is transferred from the power source 44 to the capacitive transmit electrodes of the transmit resonator 46. The power signal from the power source 44 excites the transmit resonator 46 causing the transmit resonator 46 to generate a resonant electric field. When the receiver 50 is placed within this resonant electric field, the receive resonator 52 extracts power from the transmitter 46 via resonant electric field coupling. The extracted power is then transferred from the receive resonator 52 to the load 54.

Due to the high resonance of the transmit and receive resonators 46 and 52, the capacitive transmit and receive electrodes can be partially out of alignment, and power will still be transferred between the transmitter 42 and receiver 50 of the system 40. However, the freedom of motion of the receiver 50 relative to the transmitter 42 is dependent on the geometry of the capacitive transmit and receive electrodes. Rotation about the z axis (i.e. the longitudinal axis of the capacitive transmit and receive electrodes) is restricted. When the receiver 50 is rotated by 90 (ninety) degrees in the z axis relative to the transmitter 42, the electric field generated by the capacitive transmit electrodes of the transmitter 42 results in similar electric fields at both the capacitive receive electrodes of the receiver 50. As a result, both capacitive receive electrodes have similar electric potentials producing miniscule currents. Thus, efficient wireless power transfer is difficult to achieve. Furthermore, the orientation of the capacitive receive electrodes effectively shorts the electric potential built up by the electric field procured by the transmitter 42 reducing the transmitting capacitance.

Therefore, to allow for power transfer between a structure rotating in the z axis and a stationary structure, conventional systems use slip rings or roll rings. Slip rings rely on mechanical contact between brushes and circular electrodes to affect electrical contact. The mechanical contact between the brushes and the circular electrodes causes friction, which strains motors, wears both the brushes and the circular electrodes, produces metallic dust, and varies with thermal expansions. The brushes are often made of carbon, which produces carbon dust during operation, and frequently causes burn marks on the conductive rings of the electrodes. Accordingly, slip rings frequently require maintenance and/or replacement.

Furthermore, vibrations in other components of systems that utilize slip rings may cause the slip rings to create electrical noise at the frequency of vibration since the vibrations change the quality of the electrical contact in the slip rings. In addition, many slip rings use mercury, a conducting liquid at room temperature, to reduce friction. Mercury is very hazardous and must be handled carefully. This adds extra complexity to the design of the slip rings as a containment vessel is needed. Furthermore, slip rings are often heavy and bulky.

Roll rings, instead of relying on mechanical contact between brushes and circular electrodes, use cylindrical rollers to maintain electrical contact with the circular electrodes. The mechanical contact between the cylindrical rollers and the circular electrodes causes less friction than the brushes of slip rings and the circular electrodes, which reduces strain on motors, wear on both the cylindrical rollers and the circular electrodes, and the production of metallic dust. However, roll rings rely on a snug fit between the cylindrical rollers and the circular electrodes to affect electrical contact. Variations in sizes due to thermal expansions can cause failures. Furthermore, vibrations in other components of systems that utilize roll rings may cause failures. Vibrations may also strain roll rings and lead to cracking of roll ring components. Accordingly, roll rings frequently require maintenance and replacement. Roll rings are also typically heavy and bulky.

Figure 2:
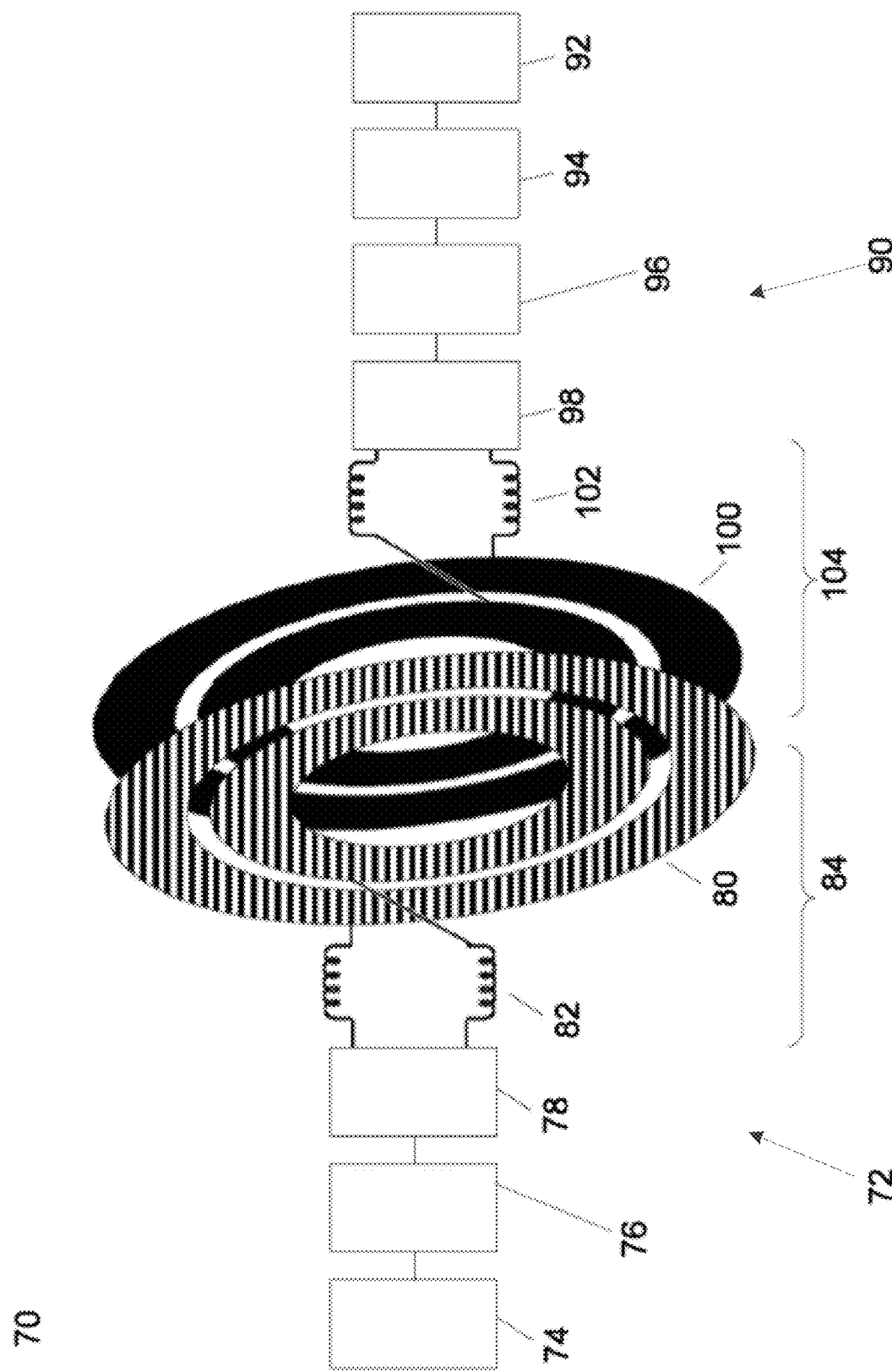
FIG. 2 is a schematic layout view of a wireless resonant electric field power transfer system.

Turning now to FIG. 2, an embodiment of a wireless power transfer system that is suitable for wirelessly transferring power between rotating and stationary structures or components is shown and is generally identified by reference numeral 70. As can be seen, the wireless power transfer system 70 comprises a transmitter 72 and a receiver 90 spaced apart from the transmitter 72. The transmitter 72 comprises a power source 74 electrically connected to a power inverter 76, which in turn is electrically connected across an inductive transmit balun 78. The inductive transmit balun 78 interconnects unbalanced and balanced systems and performs impedance transformation. The transmitter 72 further comprises a transmit electrode set 80 electrically connected to the inductive transmit balun 78 via series high quality factor (Q) transmit inductors 82. The transmit electrode set 80 comprises a pair of concentric capacitive transmit electrodes. Each capacitive transmit electrode in the transmit electrode set 80 is connected to the inductive transmit balun 78 via one of the high Q transmit inductors 82. The capacitive transmit electrodes of the transmit electrode set 80 are resonated with the series high Q transmit inductors 82 at a particular operating frequency to form a transmit resonator 84.

The receiver 90 comprises a load 92 electrically connected to a regulator 94, which in turn is electrically connected to a radio-frequency to direct current (RF-DC) rectifier 96. In this embodiment, the RF-DC rectifier 96 employs ultra-fast diodes that have a low junction capacitive, a high reverse breakdown voltage and a low forward voltage drop. The RF-DC rectifier 96 may also employ synchronous MOSFETs (metal-oxide-semiconductor field-effect transistors). The RF-DC rectifier 96 includes a tuning/matching network. The RF-DC 96 rectifier is electrically connected across an inductive receive balun 98. Similar to the inductive transmit balun 78, the inductive receive balun 98 interconnects unbalanced and balanced systems and performs impedance transformation. The receiver 90 further comprises a receive electrode set 100 electrically connected to the inductive receive balun 98 via series high Q receive inductors 102. The receive electrode set 100 comprises a pair of concentric capacitive receive electrodes. Each capacitive receive electrode in the receive electrode set 100 is connected to the inductive receive balun 98 via one of the high Q receive inductors 102. The capacitive receive electrodes of the receive electrode set 100 are resonated with the series high Q receive inductors 102 at the same operating frequency as the transmit resonator 84 to form a receive resonator 104.

High Q indicates that the amount of energy stored is greater than the energy dissipated. In this embodiment, the quality factor of the transmit and receive inductors 82 and 102 is approximately 200. One of skill in the art will appreciate that other quality factors are possible.

The load 92 may comprise loads identified in U.S. patent application Ser. No. 13/607,474. Further exemplary loads 92 include, but are not limited to: electric motors, batteries (AA, 9V and non-traditional or custom rechargeable battery formats), radio communication devices, computer batteries (desktop, laptop and tablet), phones (cordless, mobile and cellular), television sets (e.g. Plasma, LCD, LED and OLED) and home electronics (e.g. DVD players, Blu-ray players, receivers, amplifiers, all-in-one home theatre, speakers, sub-woofers, video game consoles, video game controllers, remote control devices, televisions, computers or other monitors, digital cameras, video cameras, digital photo frames, video or image projectors and media streaming devices).

Figure 3:
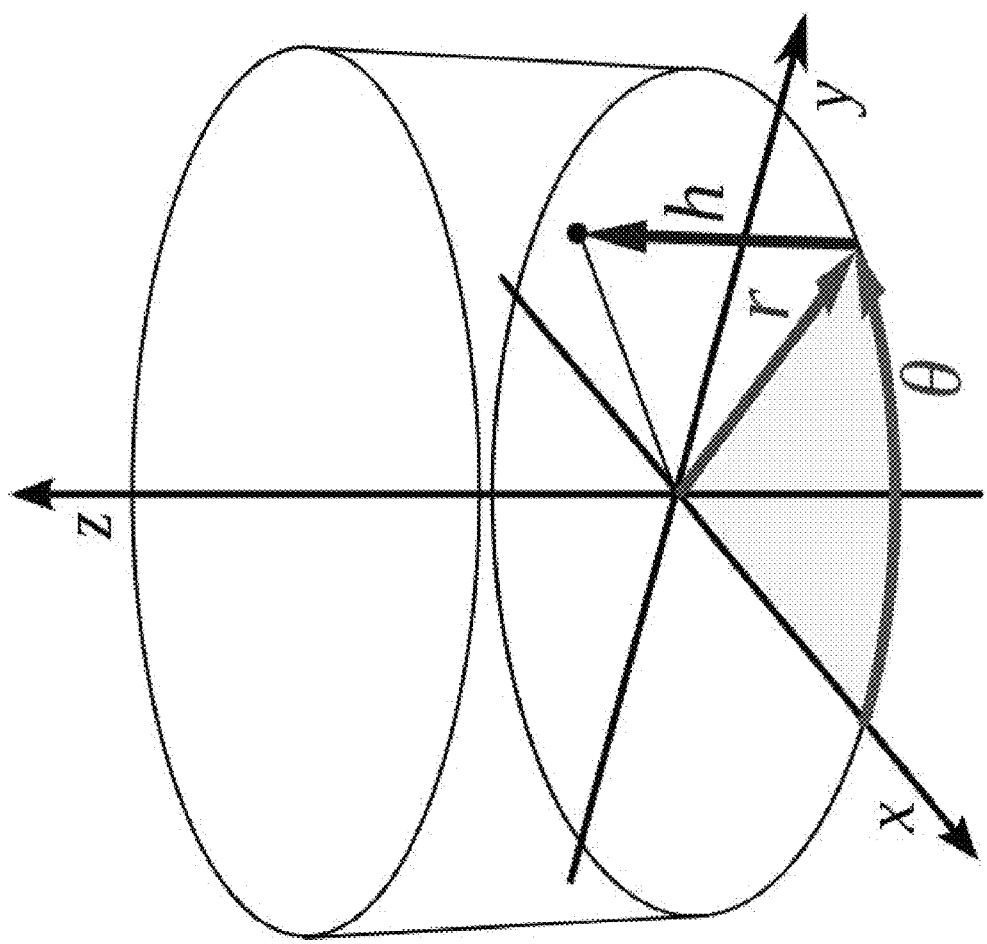
FIG. 3 is a perspective view of an axes diagram.

Turning now to FIG. 3, an axis reference diagram is shown. FIG. 3 illustrates the conventional Cartesian coordinate system comprising x, y, and z axes. The x and y axes are perpendicular to each other and to the z axis. FIG. 3 also illustrates the cylindrical coordinate system. In the cylindrical coordinate system, the h axis is the same as the z axis, the r axis is the radial axis, and θ is the azimuthal or the rotational axis.

Figure 4B:
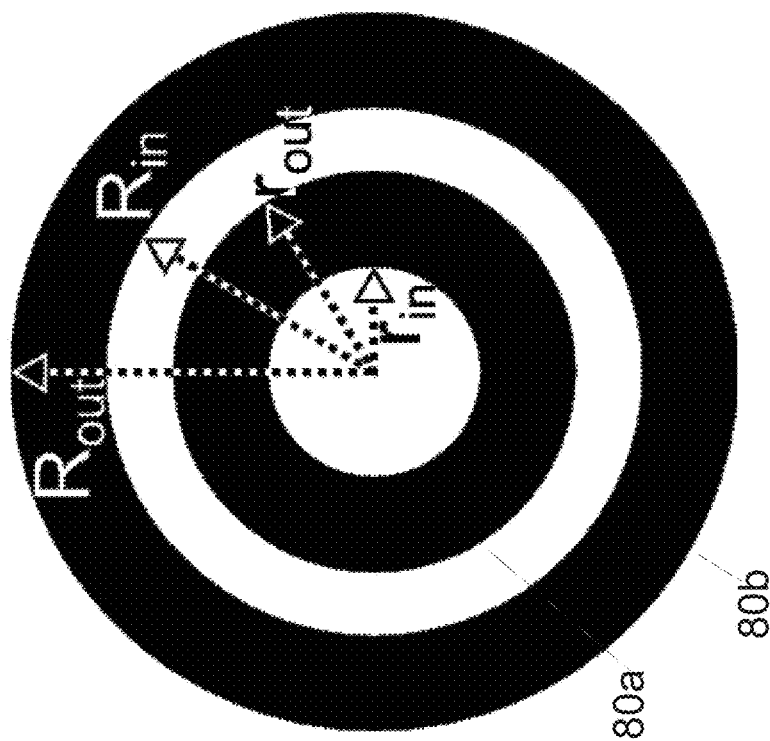
Figure 4A:
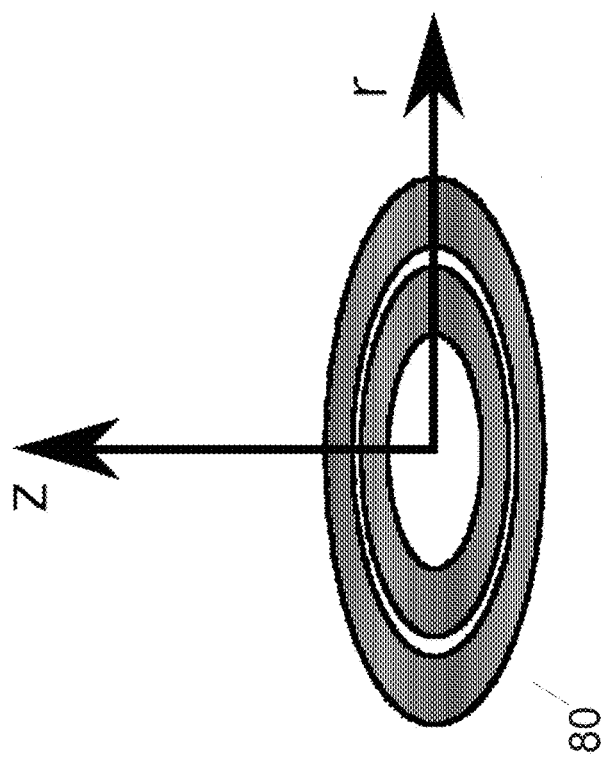
FIG. 4a is a perspective view of a transmit electrode set forming part of a transmitter of the system of FIG. 2.

Turning now to FIGS. 4a and 4b, the transmit electrode set 80 is better illustrated. While the transmit electrode set 80 is shown, it will be appreciated that, in this embodiment, the receive electrode set 100 is identically configured. As can be seen, in this embodiment, the transmit electrode set 80 comprises an inner capacitive circular ring, transmit electrode 80a positioned within the inner area and circumscribed by an outer capacitive circular ring, transmit electrode 80b. The inner and outer capacitive transmit electrodes 80a and 80b are centered on the z-axis as shown in FIG. 4a with the plane of the transmit electrode set 80 lying in the x-y plane. The inner capacitive transmit electrode 80b has an inner radius of $r_{in}$ and an outer radius of $r_{out}$. The outer capacitive transmit electrode 80b has an inner radius of $R_{in}$ and an outer radius of $R_{out}$. In this embodiment, the relationship between the radii is given by the following equation:

$$0 \le r_{in} < r_{out} < R_{in} < R_{out}$$

For the purpose of the subject application, concentric is defined as at least including one of the following: the electrodes of the electrode set have a common central axis, the electrodes of the electrode set have a common center of rotation, the electrodes of the electrode set have a common center of mass, the electrodes of the electrode set have a common center of volume, the electrodes of the electrode set have a common center of curvature, the outer electrode of the electrode set circumscribes each inner electrode of the electrode set, and the shape formed by extending the periphery of the outer electrode of the electrode set in the z-axis circumscribes each inner electrode of the electrode set. Concentric is not necessarily limited to circular electrodes.

During operation, power is transferred from the power source 74 to the power inverter 76. The power inverter 76 outputs an RF signal at the operating frequency that excites the transmit resonator 84 via the inductive transmit balun 78 causing the transmit resonator 84 to generate an alternating resonant electric field. When the receiver 90 is placed within the electric field, the receive resonator 104 extracts power from the transmitter 82 via resonant electric field coupling. The power transferred to the receive resonator 104 is then transferred to the RF-DC rectifier 96 via the inductive receive balun 98 where the power is rectified. The rectified power is then transferred to the regulator 94 which regulates the power. The regulated power is then applied to the load 92. The tuning/matching network of the RF-DC rectifier 96 ensures that the transmit and receive resonators 84 and 104 are critically coupled.

The transmit and receive resonators 84 and 104 can be over, critically or weakly coupled. When the transmit and receive resonators 84 and 104 are aligned for maximum power transfer at the highest efficiency level, there are two resonant modes at different frequencies and the transmit and receive resonators 84 and 104 are strongly coupled. As the transmit and receive resonators 84 and 104 move farther away from each other, the frequencies of the two resonant modes become closer together until they merge at one frequency, the critical coupling frequency, and the transmit and receive resonators 84 and 104 are critically coupled. When critically coupled, the transmit and receive resonators 84 and 104 resonate at the critical coupling frequency. As the transmit and receive resonators 84 and 104 move even farther apart, the efficiency level of the power transfer falls below a threshold level, here the transmit and receive resonators are said to be weakly coupled. When the transmit and receive resonators 84 and 104 are strongly or critically coupled, high efficiency power transfer can be achieved.

As will be appreciated, the geometry of the transmit electrode set 80 and the receive electrode set 100 allows for rotation of the capacitive transmit and receive electrodes in the common z axis (or h axis) and translational motion in the radial direction (r axis) as well as along the z axis while still permitting for the wireless transfer of power (see FIG. 3). As will be appreciated, this makes system 70 particularly suited to replace conventional slip rings and roll rings, and at least partially mitigates at least one of the above described issues associated with slip rings and roll rings.

Furthermore, the transmit electrode set 80 and the receive electrode set 100 can be enclosed limiting corrosion or other damage from water, sand or dust. Without the need for physical contact between the transmit and receive electrode sets 80 and 100, maintenance time and cost is reduced compared to slip rings and roller rings.

Figure 5:
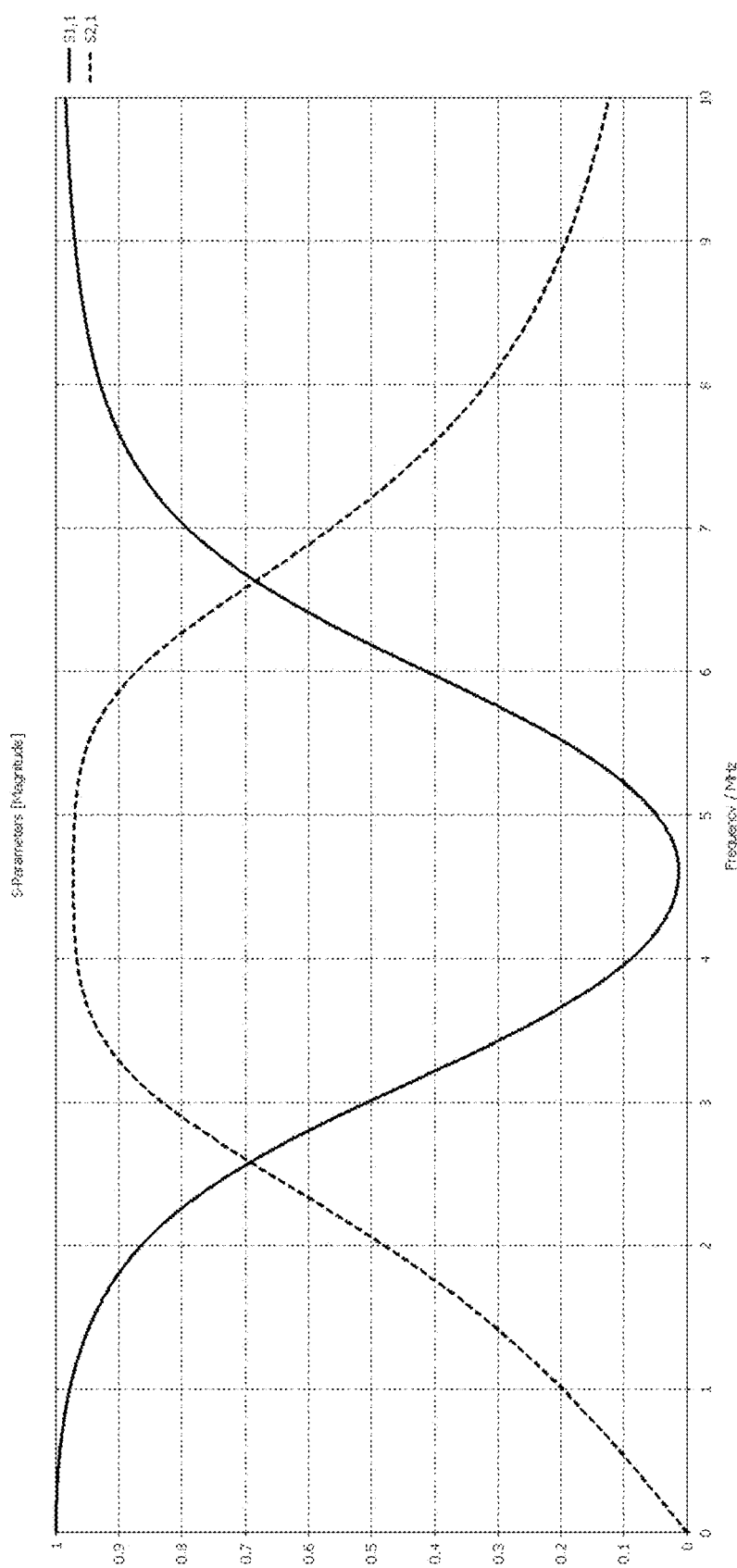
FIG. 5 is a graph of scattering parameters versus frequency of the system of FIG. 2.

Electromagnetic field simulations using CST (Computer Simulation Technology) Microwave Studio software were performed to plot the scattering parameters or S-parameters of the system 70 versus frequency as shown in FIG. 5. The system criteria were: $r_{in}$=304 mm, $r_{out}$=482 mm, $R_{in}$=532 mm, and $R_{out}$=711 mm. The transmitter 72 and the receiver 90 were parallel, and the gap between the transmitter 72 and the receiver 90 at the transmit and receive electrode sets 80 and 100 was 50.8 mm. The S-parameters of the system 70 are defined by the relationship between the reflected power wave $b_1$ at the transmitter 72 and the reflected power wave $b_2$ at the receiver 92, and the incident power wave $a_1$ at the transmitter 72 and the incident power wave $a_2$ at the receiver 92. Accordingly, the S-parameters are defined by the following relationship:

$$\begin{pmatrix} b_1 \\ b_2 \end{pmatrix} = \begin{pmatrix} S_{11} & S_{12} \\ S_{21} & S_{22} \end{pmatrix} \begin{pmatrix} a_1 \\ a_2 \end{pmatrix}$$

Due to the symmetry, $S_{11}$ and $S_{22}$ are indistinguishable as are $S_{12}$ and $S_{21}$. Accordingly, only $S_{11}$ and $S_{21}$ are plotted in FIG. 5.

Figure 6:
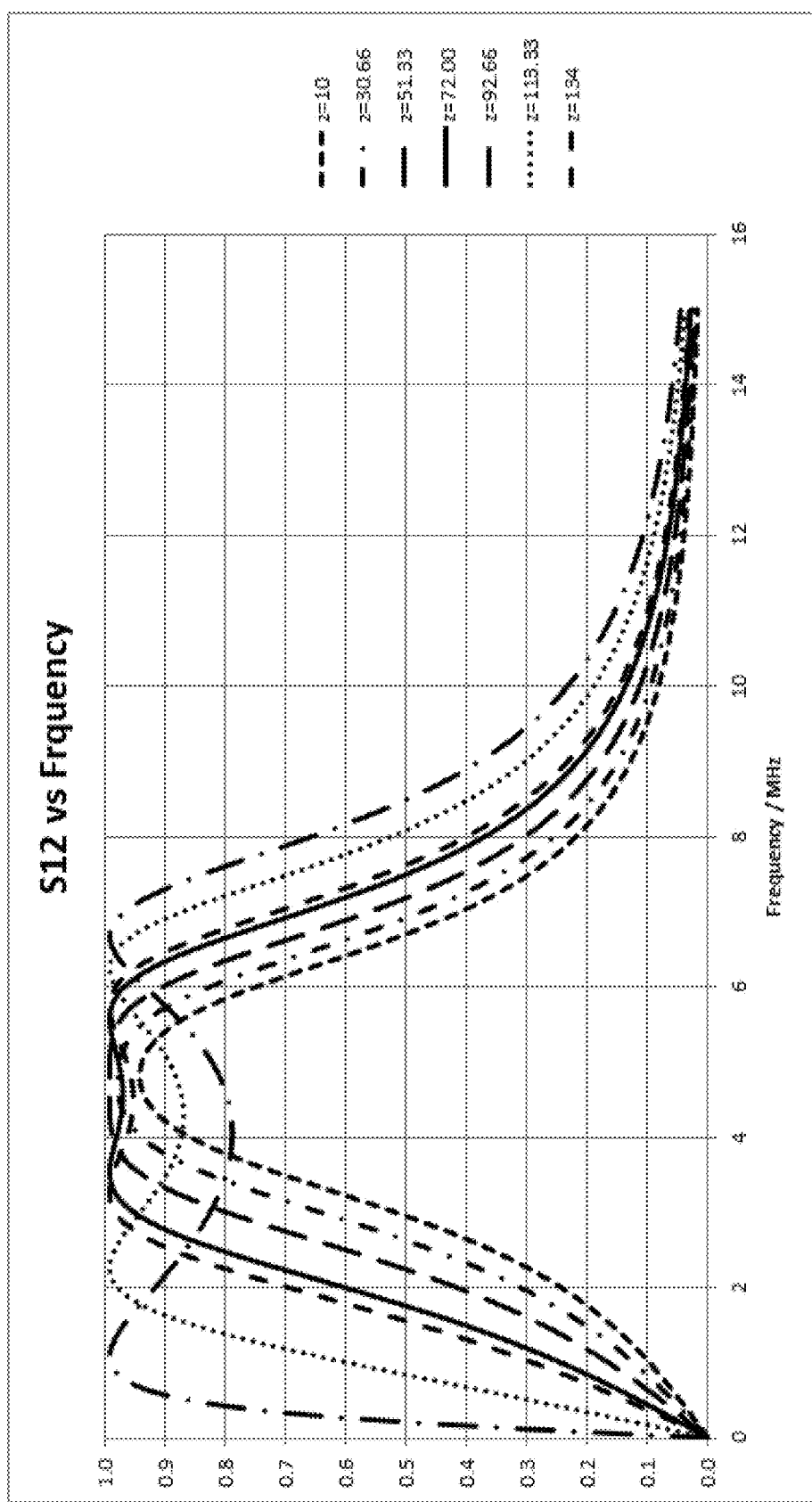
FIG. 6 is a graph of one of the scattering parameters versus frequency of the system of FIG. 2 at various separation distances.

FIG. 6 is a graph of the $S_{12}$ parameter of the system 70 versus frequency at various separation distances (in millimeters).

Tuning the transmit and receive resonators 84 and 104 prior to use eliminates the need for a tuning/matching network while maintaining critical coupling of the resonant electric field for a medium range of motion. For example, in a system critically coupled at a separation distance of 50.8 mm operating at a frequency of 5.55 MHz an efficiency of 75% or greater, can be maintained up to a separation distance of 124 mm without a tuning/matching network.

Figure 7:
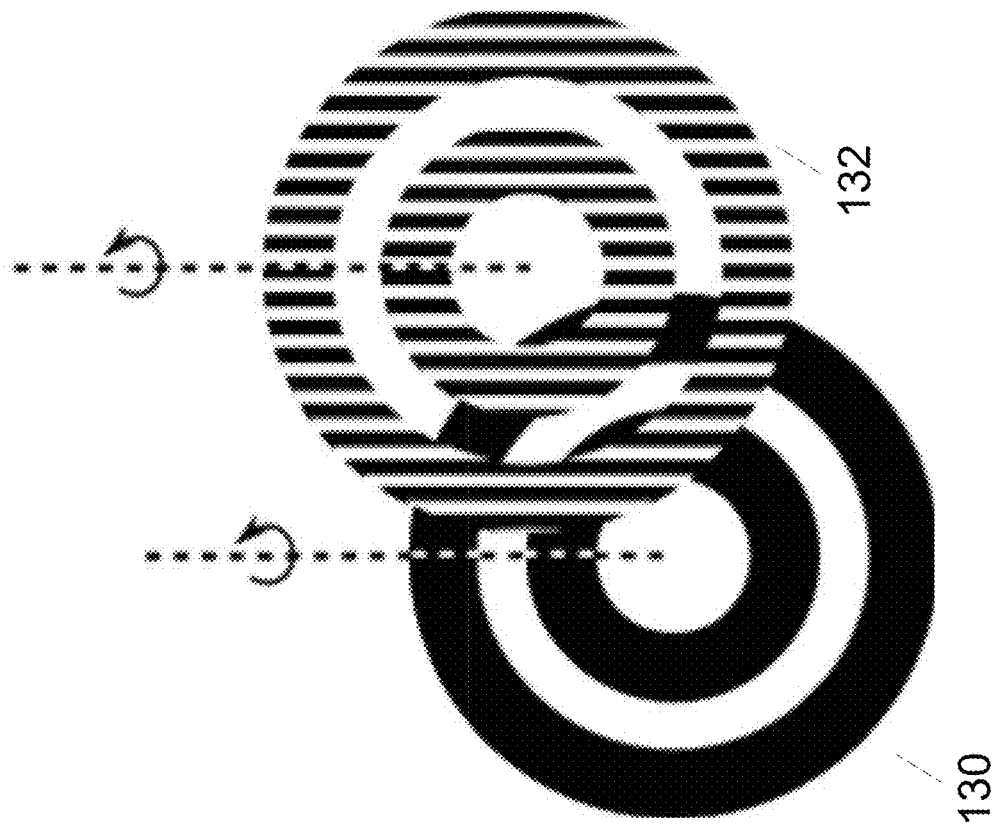
FIG. 7 is a plan view of view of an embodiment of the electrodes of the system of FIG. 2.

Although in the embodiment of FIG. 2, the transmit and receive electrode sets 80 and 100 each comprise a pair of circular ring electrodes that are co-axially aligned, alternative electrode configurations are possible. For example, turning now to FIG. 7, another embodiment of the transmit electrode set 80 and the receive electrode set 100 is shown. The transmit and receive electrode sets 80 and 100 are not co-axially aligned, as shown in FIG. 7, the overlapping area also remains constant. In the embodiment shown in FIG. 7, the transmit electrode set 80 comprises a pair of concentric electrodes 130 comprising an outer circular ring transmit electrode and an inner circular ring transmit electrode circumscribed by the outer circular ring transmit electrode. The receive electrode set 100 comprises a pair of concentric electrodes 132 comprising an outer circular ring receive electrode and an inner circular ring receive electrode circumscribed by the outer circular ring receive electrode.

In this embodiment, the axis of rotation of the receive concentric electrodes 132 is parallel, but not aligned with the axis of rotation of the transmit concentric electrodes 130. The axis of rotation of the transmit concentric electrodes 130 is aligned about the central axis (z axis) of the transmit concentric electrodes 130. Similarly, the axis of rotation of the receive concentric electrodes 132 is aligned about the central axis (z axis) of the receive concentric electrodes 132 (z axis).

Similarly, if the transmit electrode set 80 and the receive electrode 100 have the same axis of rotation, but are rotated in the θ axis (see FIG. 3), the overlapping area defined by the transmit and receive electrode set 80 and 100 remains constant.

Figure 8B:
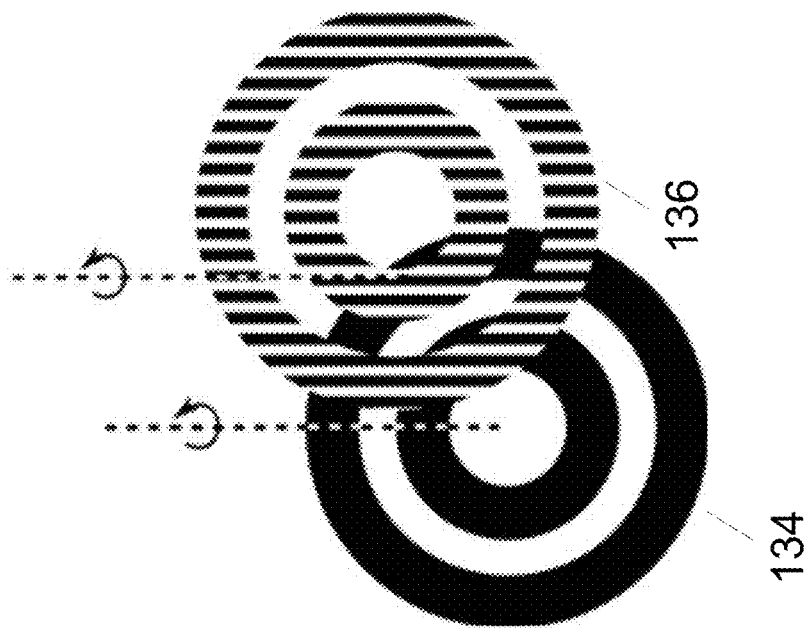
FIG. 8b is a plan view of another embodiment of the electrodes of the system of FIG. 2.
Figure 8A:
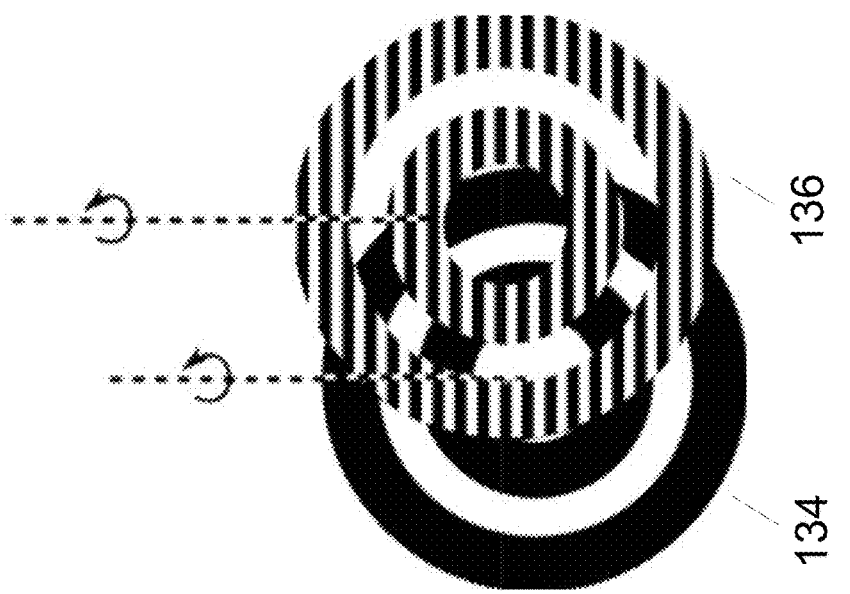
FIG. 8a is a plan view of another embodiment of the electrodes of the system of FIG. 2.
Figure 8D:
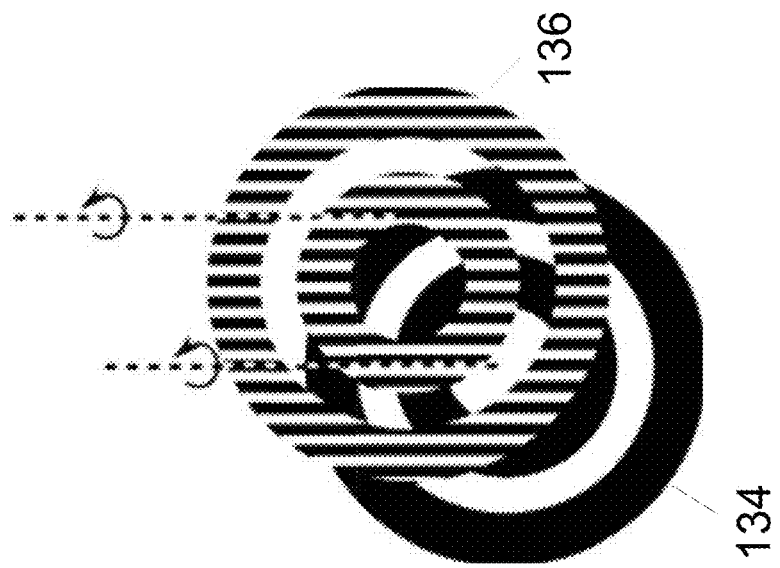
FIG. 8d is a plan view of another embodiment of the electrodes of the system of FIG. 2.
Figure 8C:
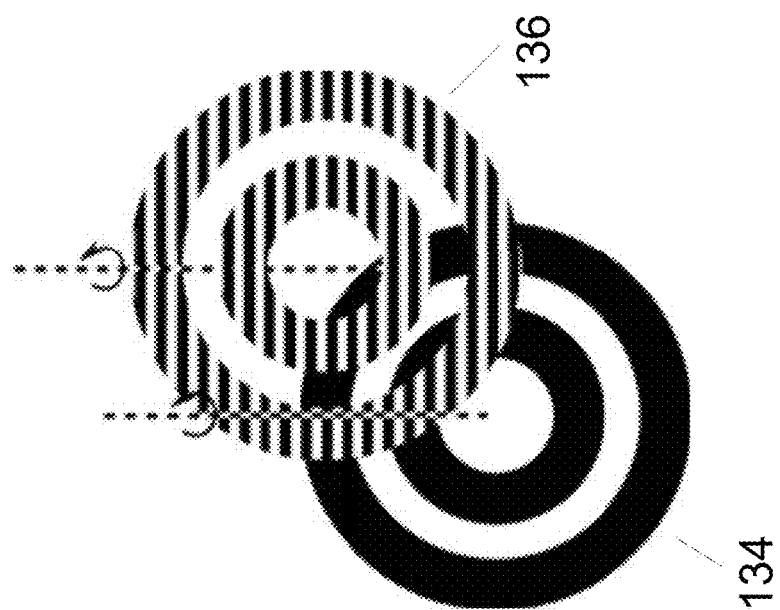
FIG. 8c is a plan view of another embodiment of the electrodes of the system of FIG. 2.

However, if one of the transmit and receive concentric electrodes 130 and 132 has a non-central axis of rotation, the resonant electric field coupling would vary with the rotation angle as the geometry of the transmit and receive concentric electrodes 130 and 132 lacks symmetry under rotation about the off-centered axis resulting in a power modulation at the rotation frequency. Turning now to FIG. 8a, transmit concentric electrodes 134 and receive concentric electrodes 136 are depicted. The receive concentric electrodes 136 have a non-central axis of rotation. FIG. 8a depicts off axis rotation with θ equal to zero degrees. FIG. 8b depicts off axis rotation with θ equal to 90 degrees. FIG. 8c depicts off axis rotation with θ equal to 180 degrees. FIG. 8d depicts off axis rotation with θ equal to 270 degrees.

The variation in coupling changes either the resonant frequency of the system 70, the power transfer efficiency of the system 70 or both. This effect can be used to detect off axis rotation for alignment purposes, or to create certain wave forms at the rotation frequency. Changes in power transfer efficiency cause variations in the output power, thus creating a wave form. The electrode sets 80 and 100 may be designed to create specific wave patterns. These wave patterns can be used for loads that have varying power requirement with rotation angle. However, instead of using this effect to detect off axis rotation, the power modulation may be, at least partially, eliminated with the tuning/matching network of the RF-DC rectifier 96 that compensates for the change in coupling strength based on the angular position. Off axis rotation causes variation in the mutual capacitance of the system 70 which causes a change in impedance which is compensated for by the tuning/matching network of the RF-DC rectifier 96. The RF-DC rectifier 96 may further include a band pass filter to filter out low frequency modulation and average the extracted power of the period of rotation which may result in a drop in power extracted, that may result in decreased power transfer efficiency.

Although in the embodiment of FIG. 2, the transmit and receive electrode sets 80 and 100 each comprise a pair of circular ring electrodes, alternative electrode configurations are possible. For example, turning now to FIG. 9, another embodiment of the transmit electrode set 80 and the receive electrode set 100 is shown. In this embodiment, the transmit electrode set 80 comprises a pair of concentric electrodes comprising an outer circular ring transmit electrode 140 and an inner transmit electrode 142 in the form of a disc (i.e. having an $r_{in}$ of zero) circumscribed by the outer circular ring transmit electrode 140. The receive electrode set 100 similarly comprises a pair of concentric electrodes comprising an outer circular ring receive electrode 144 and an inner receive electrode 146 in the form of a disc (i.e. having an $r_{in}$ of zero) circumscribed by the outer circular ring receive electrode 144. In this embodiment, the electrodes of both the transmit and receive electrode sets 80 and 100 are centered on the z-axis and the planes of the electrodes of the transmit and receive electrode sets 80 and 100 are parallel and lie in the x-y plane.

Figure 10B:
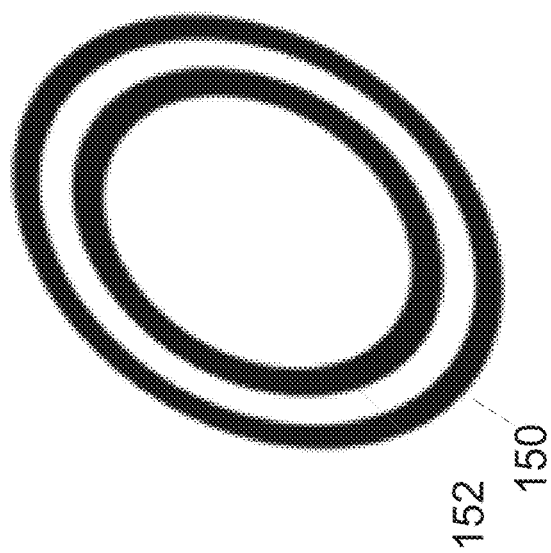
Figure 10A:
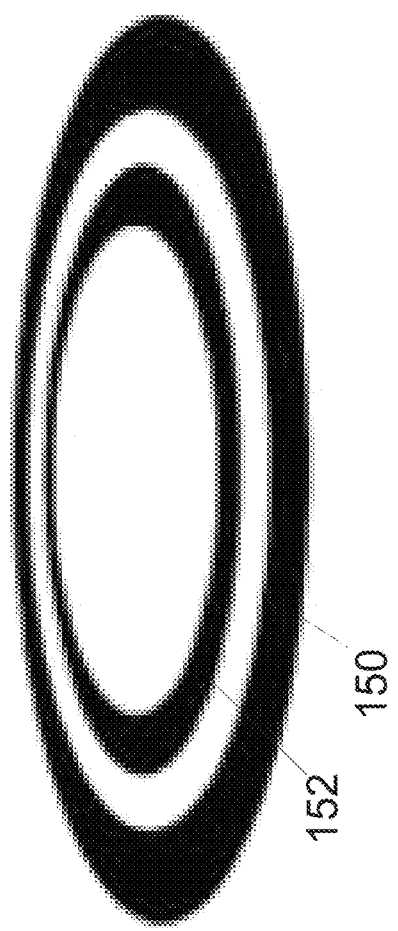
FIG. 10a a perspective view of another embodiment of the electrodes of the system of FIG. 2.

Turning now to FIGS. 10a and 10b, another embodiment of the transmit electrode set 80 is shown. In this embodiment, the transmit electrode set 80 comprises a pair of concentric electrodes comprising an outer elliptical ring transmit electrode 150 and an inner elliptical ring transmit electrode 152 circumscribed by the outer elliptical ring transmit electrode 150. The electrodes of the transmit electrode set 80 are centered on the z-axis and the planes of the electrodes of the transmit electrode set 80 are parallel and lie in the x-y plane. While only the transmit electrode set 80 is shown, it will be appreciated that the receive electrode set 100 may be identically configured.

Figure 11B:
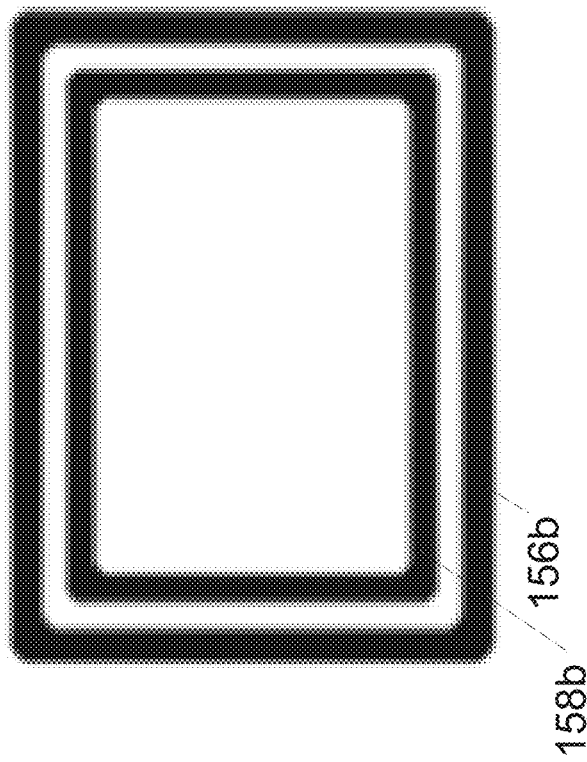
FIG. 11b is a plan view of another embodiment of the electrodes of the system of FIG. 2.
Figure 11A:
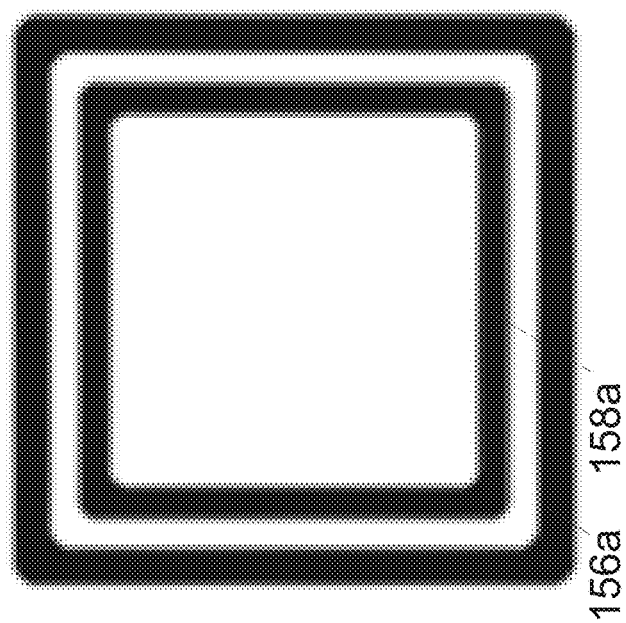
FIG. 11a is a plan view of another embodiment of the electrodes of the system of FIG. 2.
Figure 12B:
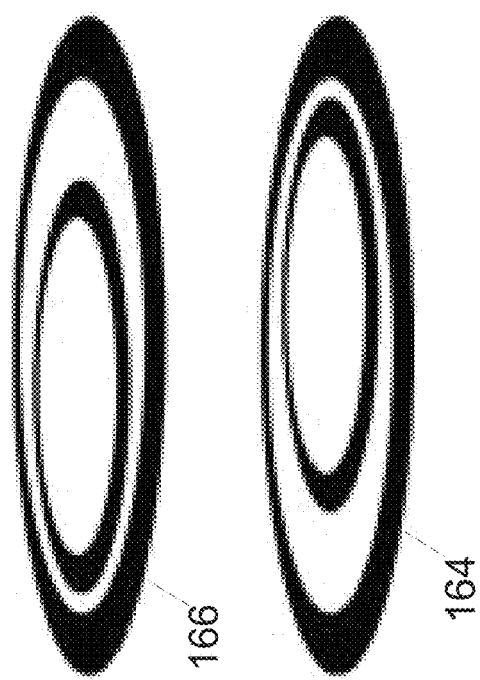
FIG. 12b is a perspective view of another embodiment of the electrodes of the system of FIG. 2.

Turning now to FIGS. 11a and 12b, other embodiments of the transmit electrode set 80 are shown. In the embodiment shown in FIG. 11a, the transmit electrode set 80 comprises a pair of concentric transmit electrodes comprising an outer square ring transmit electrode 156a and an inner square ring transmit electrode 158a circumscribed by the outer square ring transmit electrode 156a. In the embodiment shown in FIG. 11b, the transmit electrode set 80 comprises a pair of concentric transmit electrodes comprising an outer rectangular ring transmit electrode 156b and an inner rectangular ring transmit electrode 158b circumscribed by the outer rectangular ring transmit electrode 156b. In the embodiments shown in FIGS. 11a and 11b, the electrodes of the transmit electrode set 80 are centered on the z-axis and the planes of the electrodes of the transmit electrode set 80 are parallel and lie in the x-y plane. While only the transmit electrode sets 80 are shown, it will be appreciated that the receive electrode sets 100 may be identically configured.

Figure 12A:
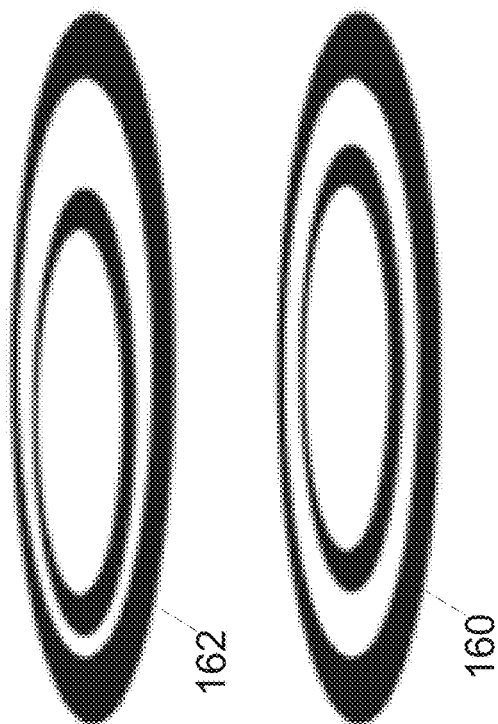
FIG. 12a is a perspective view of another embodiment of the electrodes of the system of FIG. 2.

Turning now to FIGS. 12a and 12b, other embodiments of the transmit electrode set 80 and the receive electrode set 100 are shown. In the embodiment shown in FIG. 12a, the transmit electrode set 80 comprises a pair of concentric transmit electrodes 160 comprising an outer elliptical ring transmit electrode and an inner elliptical ring transmit electrode that have a common central axis. The inner elliptical ring transmit electrode is circumscribed by the outer elliptical ring transmit electrode. The receive electrode set 100 comprises a pair of concentric receive electrodes 162 comprising an outer elliptical ring receive electrode and an inner elliptical ring receive electrode that do not have a common central axis. The inner elliptical ring receive electrode is circumscribed by the outer elliptical ring receive electrode. While the electrodes 160 of the transmit electrode set 80 have been shown as having a common central axis and the electrodes 162 of the receive electrode set 100 have been shown as not having a common central axis, it will be appreciated that the configuration can be reversed.

In the embodiment shown in FIG. 12b, the transmit electrode set 80 comprises a pair of concentric transmit electrodes 164 comprising an outer elliptical ring transmit electrode and an inner elliptical ring transmit electrode that do not have a common central axis. The inner elliptical ring transmit electrode is circumscribed by the outer elliptical ring transmit electrode. The receive electrode set 100 comprises a pair of concentric receive electrodes 166 comprising an outer elliptical ring receive electrode and an inner elliptical ring receive electrode that do not have a common central axis. The inner elliptical ring receive electrode is circumscribed by the outer elliptical ring receive electrode.

In the embodiments shown in FIGS. 12a and 12b, resonant electric field coupling varies with the rotation angle θ when the electrode sets are not axially aligned about the central axes shared by the outer elliptical ring transmit and receive electrodes resulting in modulation in the power extracted by the receiver 90 at the rotation frequency. This creates waveforms at the rotation frequency. The tuning/matching network of the RF-DC rectifier 96 compensates for the change in coupling strength based on the angular position. As mentioned previously, the RF-DC rectifier 96 may further include a band pass filter to filter out low frequency modulation and average the extracted power of the period of rotation which may result in a drop in power extracted that may result in decreased power transfer efficiency.

Figure 13B:
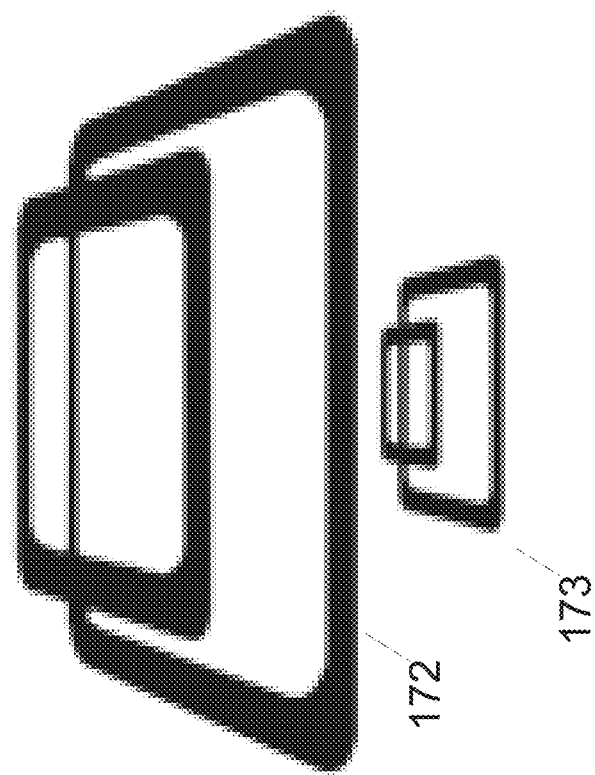
FIG. 13b is a perspective view of another embodiment of the electrodes of the system of FIG. 2.
Figure 13A:
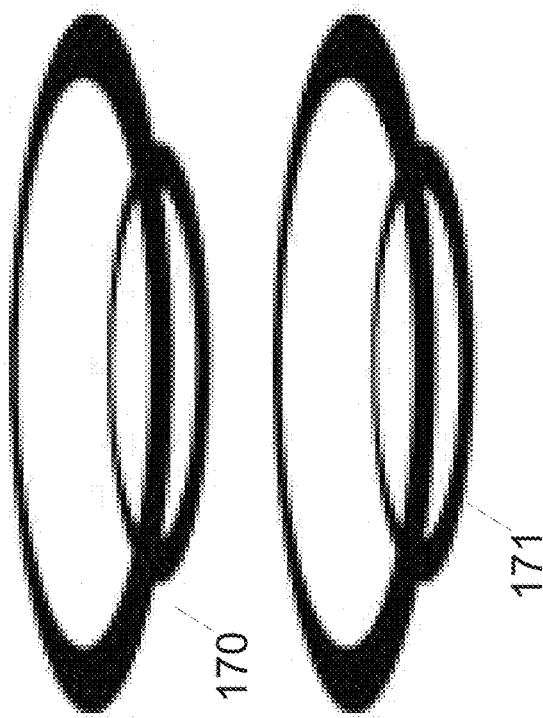
FIG. 13a is a perspective view of another embodiment of the electrodes of the system of FIG. 2.

Turning now to FIGS. 13a and 13b, further embodiments of the transmit electrode set 80 and the receive electrode set 100 are shown. In the embodiment shown in FIG. 13a, the transmit electrode set 80 comprises a pair of concentric non-coplanar transmit electrodes 171 comprising an outer elliptical ring transmit electrode and an inner elliptical ring transmit electrode. The inner elliptical ring transmit electrode is circumscribed by the projection of the outer elliptical ring transmit electrode along the z axis. The receive electrode set 100 comprises a pair of concentric non-coplanar receive electrodes 170 comprising an outer elliptical ring receive electrode and an inner elliptical ring receive electrode offset along the z axis. The inner elliptical ring receive electrode is circumscribed by the projection of the outer elliptical ring receive electrode along the z axis.

In the embodiment shown in FIG. 13b, the transmit electrode set 80 comprises a pair of concentric non-coplanar transmit electrodes 173 comprising an outer square ring transmit electrode and an inner square ring transmit electrode offset along the z axis. The inner square ring transmit electrode is circumscribed by the projection of the outer square ring transmit electrode along the z axis. The receive electrode set 100 comprises a pair of concentric non-coplanar receive electrodes 172 comprising an outer square ring receive electrode and an inner square ring receive electrode offset along the z axis. The inner square ring receive electrode is circumscribed by the projection of the outer square ring receive electrode along the z axis. The pair of concentric non-coplanar receive electrodes 172 define a substantially smaller volume than the pair of concentric non-coplanar transmit electrodes 173.

Figure 14:
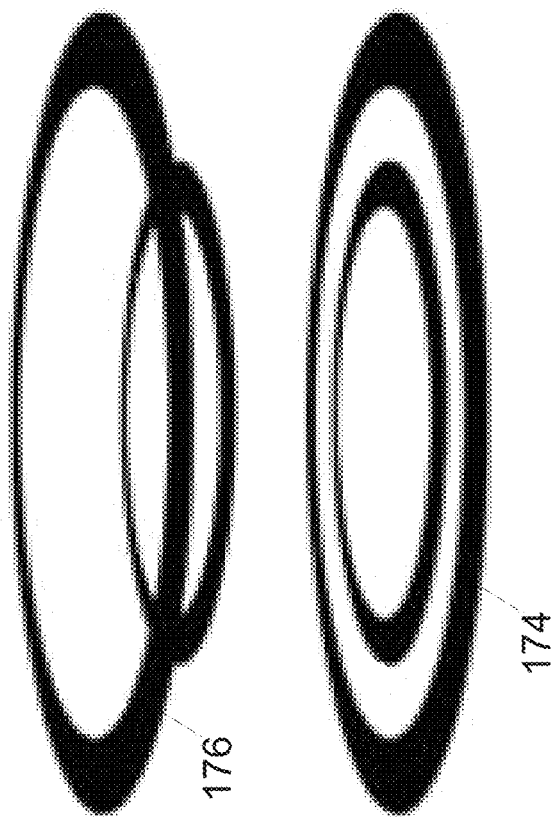
FIG. 14 is a perspective view of another embodiment of the electrodes of the system of FIG. 2.

Turning now to FIG. 14, another embodiment of the transmit electrode set 80 and the receive electrode set 100 is shown. In this embodiment, the transmit electrode set 80 comprises a pair of concentric coplanar transmit electrodes 174 comprising an outer elliptical ring transmit electrode and an inner elliptical ring electrode circumscribed by the outer elliptical ring transmit electrode. The receive electrode 100 comprises a pair of concentric non-coplanar receive electrodes 176 comprising an outer elliptical ring receive electrode and an inner elliptical ring receive electrode offset along the z axis. The inner elliptical ring receive electrode is circumscribed by the projection of the outer elliptical ring receive electrode along the z axis. The electrodes of both the transmit and receive electrode sets 80 and 100 are centered on the z axis. While the transmit electrode set 80 has been shown as comprising a pair of concentric coplanar transmit electrodes 174 and the receive electrode set 100 has been shown as comprising a pair of concentric non-coplanar receive electrodes 176, it will be appreciated that this configuration could be reversed.

Figure 15:
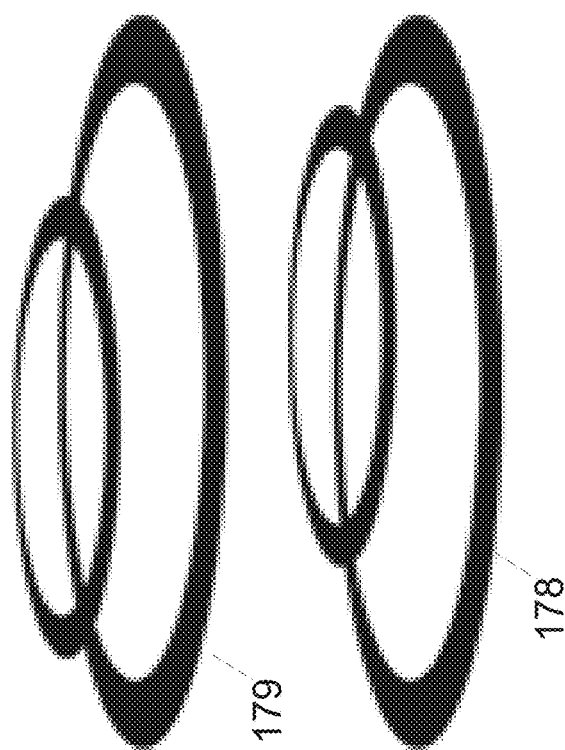
FIG. 15 is a perspective view of another embodiment of the electrodes of the system of FIG. 2.

Turning now to FIG. 15, another embodiment of the transmit electrode set 80 and the receive electrode set 100 is shown. In this embodiment, the transmit electrode set 80 comprises a pair of concentric non-coplanar transmit electrodes 178 comprising an outer elliptical ring transmit electrode and an inner elliptical ring transmit electrode offset along the z axis. The inner elliptical ring transmit electrode is circumscribed by the projection of the outer elliptical ring transmit electrode. The inner elliptical ring transmit electrode is not axially aligned with the outer elliptical transmit electrode. The receive electrode set 100 comprises a pair of concentric non-coplanar receive electrodes 179 comprising an outer elliptical ring receive electrode and an inner elliptical ring receive electrode offset along the z axis. The inner elliptical ring receive electrode is circumscribed by the projection of the outer elliptical ring receive electrode along the z axis. The inner elliptical ring receive electrode is not axially aligned with the outer elliptical receive electrode.

Figure 16B:
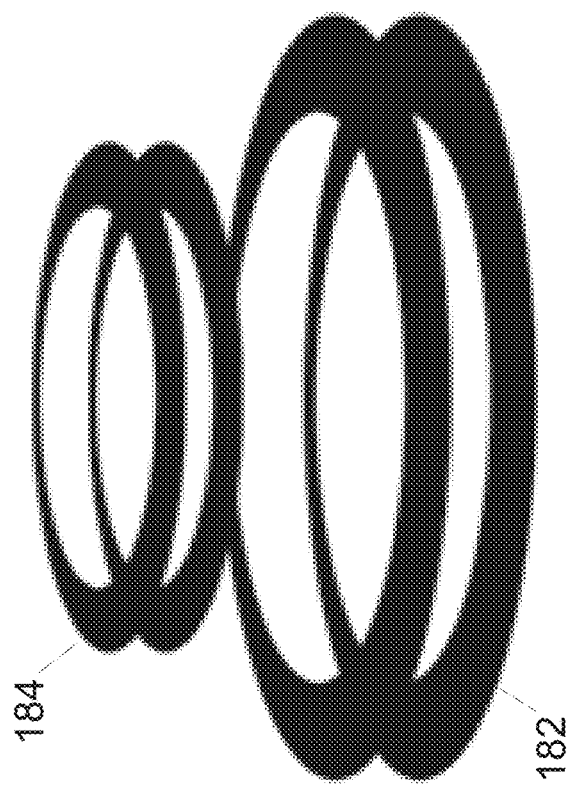
FIG. 16b is a perspective view of another embodiment of the electrodes of the system of FIG. 2.
Figure 16A:
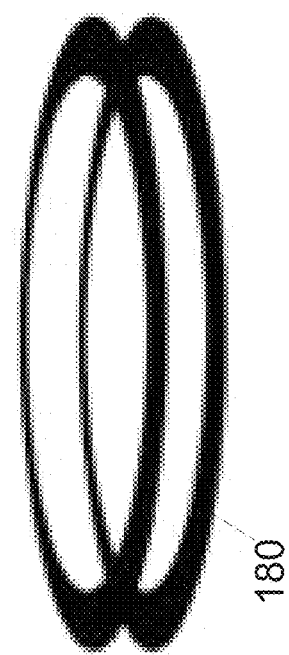
FIG. 16a is a perspective view of another embodiment of the electrodes of the system of FIG. 2.

Turning now to FIG. 16a, another embodiment of the transmit electrode set 80 is shown. In this embodiment, the transmit electrode set comprises a pair of concentric electrodes 180 comprising an outer elliptical ring transmit electrode and an inner elliptical ring transmit electrode having identical radii (i.e. $r_{in}=R_{in}$ and $r_{out}=R_{out}$). While a transmit electrode set 80 has been shown, it will be appreciated that this configuration could be applied to the receive electrode set 100.

Turning now to FIG. 16b, another embodiment of the transmit electrode set 80 and the receive electrode set 100 is shown. In this embodiment, the transmit electrode set 80 comprises a pair of concentric transmit electrodes 182 comprising an outer elliptical ring transmit electrode and inner elliptical ring transmit electrode having identical radii (i.e. $r_{in}=R_{in}$ and $r_{out}=R_{out}$). The receive electrode set 100 comprises a pair of concentric receive electrodes 184 comprising an outer elliptical ring receive electrode and an inner elliptical ring receive electrode having identical radii electrode (i.e. $r_{in}=R_{in}$ and $r_{out}=R_{out}$). The pair of concentric receive electrodes 184 define a substantially smaller volume than the pair of concentric transmit electrodes 182.

Turning now to FIG. 16c, another embodiment of the transmit electrode set 80 and the receive electrode set 100 is shown. In this embodiment, the transmit electrode set 80 comprises a pair of non-coplanar concentric transmit electrodes 308 comprising an outer ring transmit electrode and an inner ring transmit electrode having identical radii (i.e. $r_{in}=R_{in}$ and $r_{out}=R_{out}$). The receive electrode set 100 similarly comprises a pair of concentric receive electrodes 310 comprising an outer ring receive electrode and an inner ring receive electrode having identical radii (i.e. $r_{in}=R_{in}$ and $r_{out}=R_{out}$). The receive electrodes 310 are positioned within the volume defined by the transmit electrodes 308.

Figure 17:
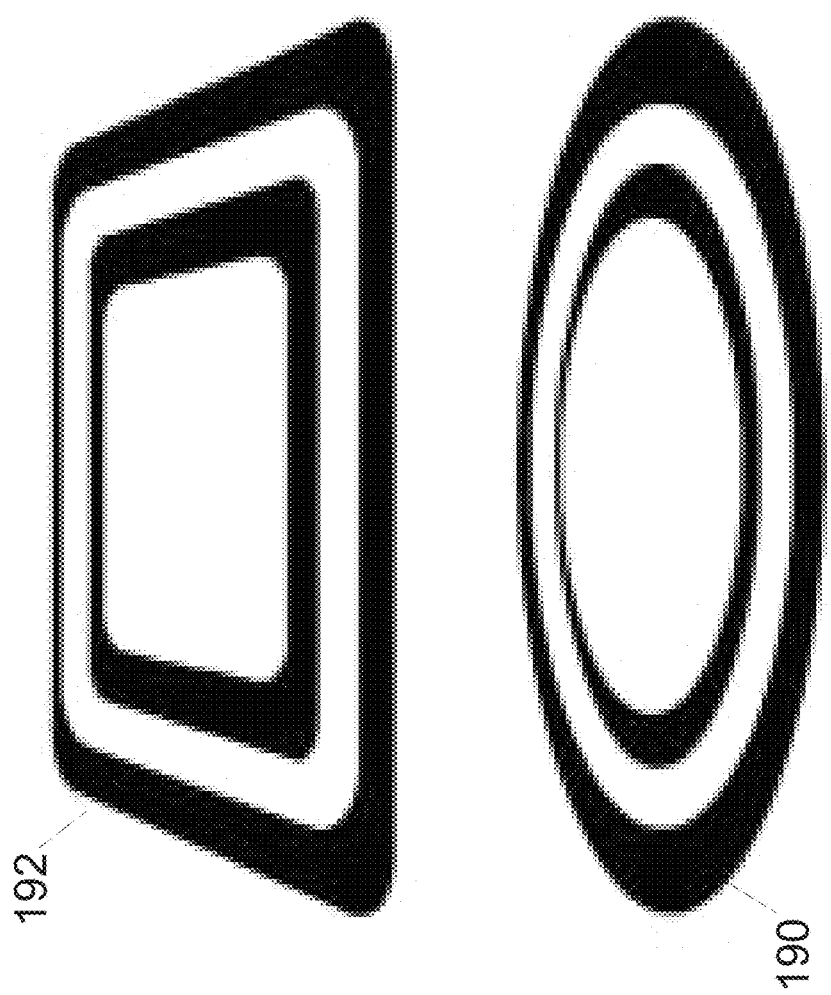
FIG. 17 is a perspective view of another embodiment of the electrodes of the system of FIG. 2.

Turning now to FIG. 17, another embodiment of the transmit electrode set 80 and the receive electrode set 100 is shown. In this embodiment, the transmit electrode set 80 comprise a pair of concentric transmit electrodes 190 comprising an outer circular ring transmit electrode and an inner circular ring transmit electrode circumscribed by the outer circular ring transmit electrode. The receive electrode set 100 comprises a pair of concentric receive electrodes 192 comprising an outer square ring receive electrode and an inner square ring receive electrode circumscribed by the outer square ring receive electrode. While the transmit electrode set 80 has been shown as comprising circular ring transmit electrodes and the receive electrode set 100 has been shown as comprising square ring receive electrodes, it will be appreciated that this may be reversed.

Figure 18B:
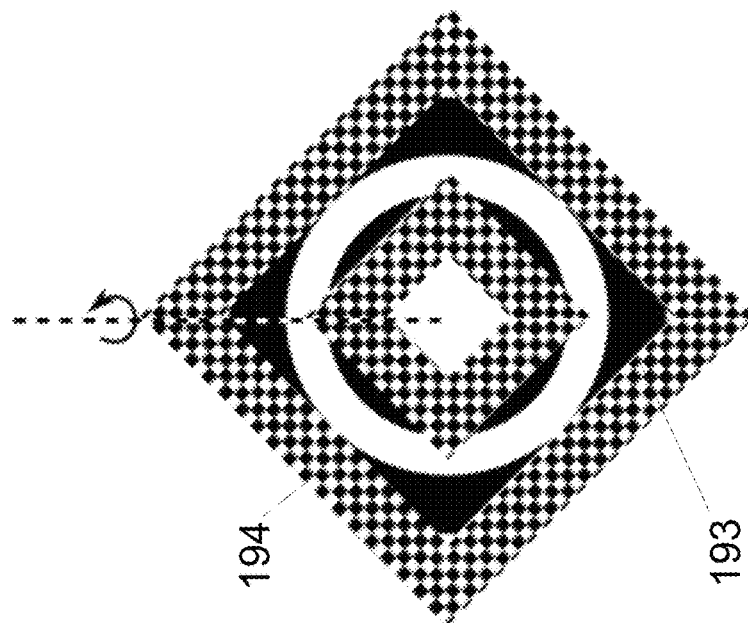
FIG. 18b is a plan view of another embodiment of the electrodes of the system of FIG. 2.
Figure 18A:
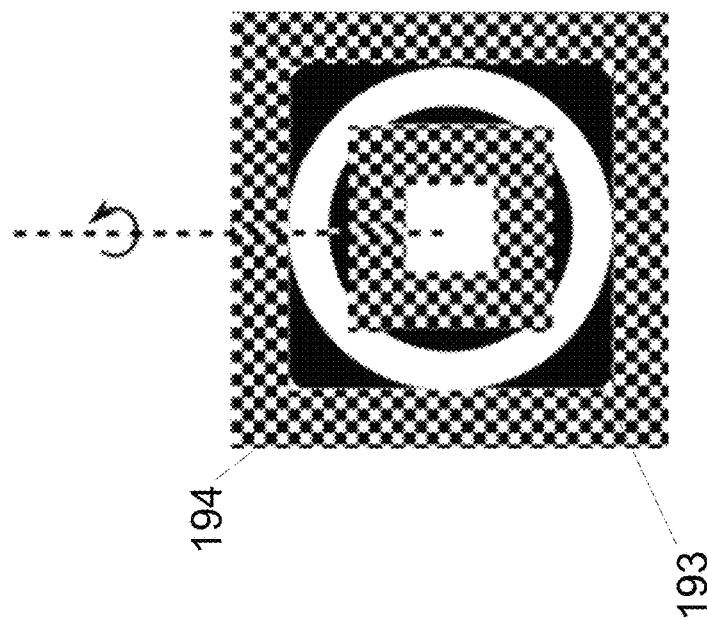
FIG. 18a is a plan view of another embodiment of the electrodes of the system of FIG. 2.

Turning now to FIGS. 18a and 18b, another embodiment of the transmit electrode set 80 and the receive electrode set 100 is shown. In the embodiment shown in FIG. 18a, the transmit electrode set 80 comprises a pair of concentric transmit electrodes 193 comprising an outer circular ring transmit electrode and an inner circular ring transmit electrode circumscribed by the outer circular ring transmit electrode. The receive electrode set 100 comprises a pair of concentric receive electrodes 194 comprising an outer square ring receive electrode and an inner square ring receive electrode circumscribed by the outer square ring receive electrode. The concentric transmit electrodes 193 and the concentric receive electrodes 194 are co-axially aligned. As such, if the concentric receive electrodes 193 are rotated about the z axis (see FIG. 3), the overlapping area defined by the concentric transmit and receive electrodes 193 and 194 remains constant. This is clearly illustrated in FIGS. 18a and 18b. FIG. 18a depicts the concentric transmit and receive electrodes 193 and 194 with θ equal to zero degrees. FIG. 18b depicts the concentric transmit and receive electrodes 193 and 194 with the concentric receive electrodes 193 rotated 45 degrees in the θ axis. As long as one of the transmit and receive electrodes 193 and 194 comprise circular ring electrodes the electric field will be uniformly coupled between the transmit and receive electrodes 193 and 194 through all rotations about the z axis as the overlapping area defined by the transmit and receive electrodes 193 and 194 remains constant.

Figure 20:
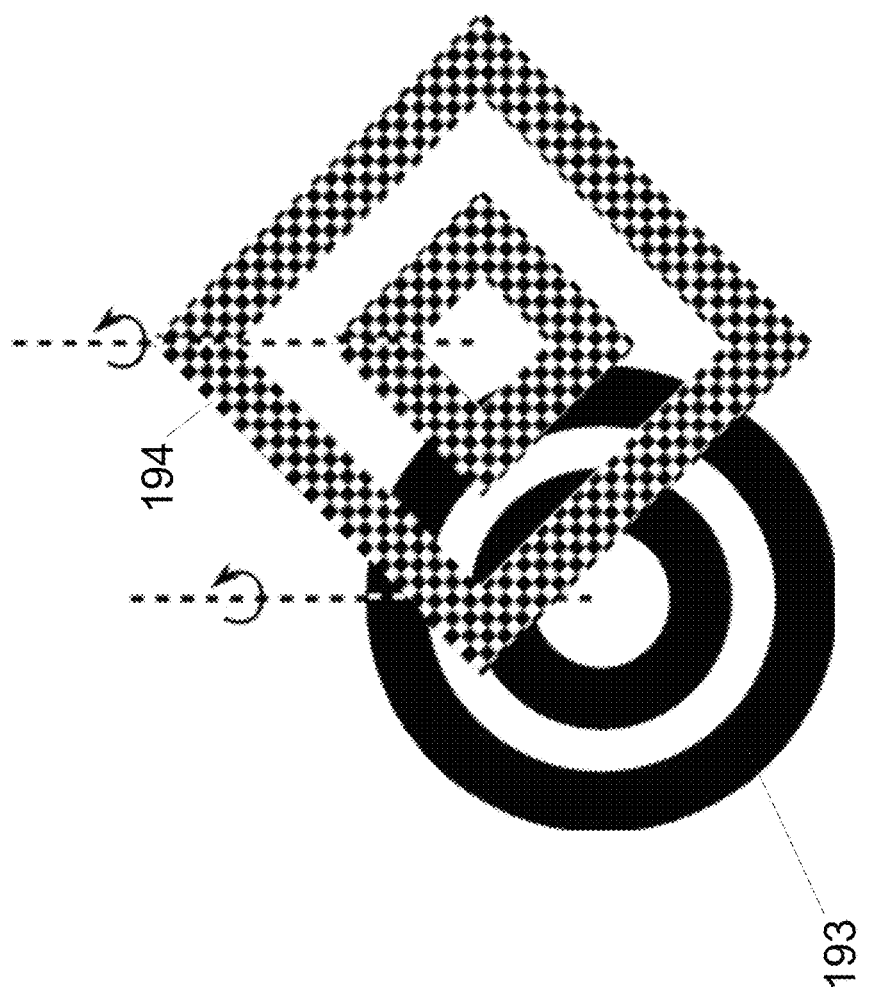
FIG. 20 is a plan view of another embodiment of the electrodes of the system of FIG. 2.

However, if one of concentric transmit and receive electrodes 193 and 194 has a non-central axis of rotation, the resonant electric field coupling would vary with the rotation angle resulting in a power modulation at the rotation frequency. Turning now to FIG. 19, the receive electrodes 194 depicted have a non-central axis of rotation. FIG. 19 depicts off axis rotation with θ equal to zero degrees. FIG. 20 depicts off axis rotation with the concentric receive electrodes 193 having a rotation of θ equal to forty five degrees. The variation in coupling changes either the resonant frequency of the system 70, the power transfer efficiency of the system 70 or both. As previously stated, this effect can be used to detect off axis rotation for alignment purposes, or to create certain wave forms at the rotation frequency. Changes in power transfer efficiency cause variations in the output power, thus creating a wave form. The concentric transmit and receive electrodes 193 and 194 may be designed to create specific wave patterns. These wave patterns can be used for loads that have varying power requirement with rotation angle.

Figure 21:
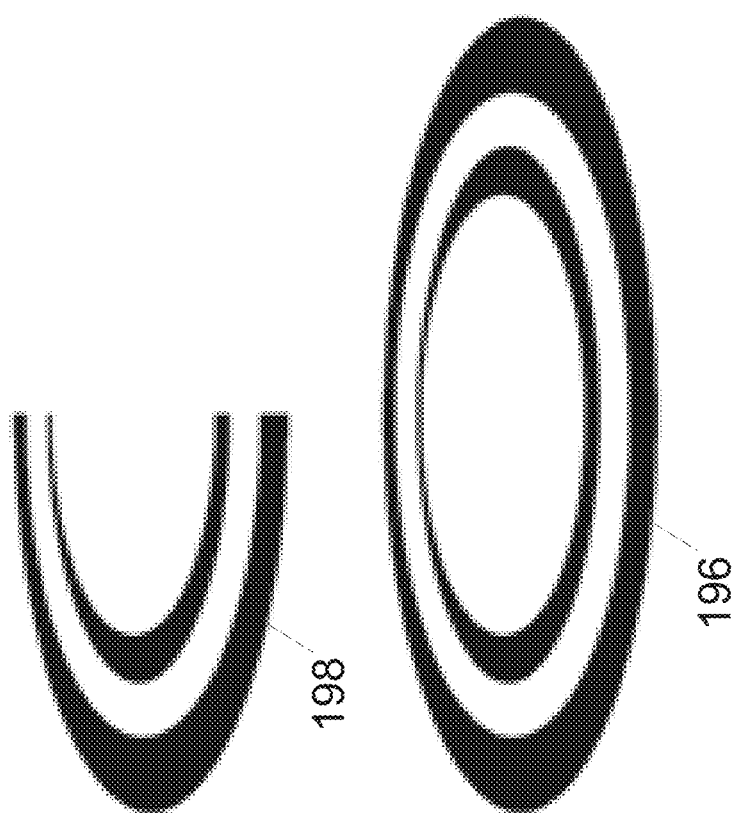
FIG. 21 is a perspective view of another embodiment of the electrodes of the system of FIG. 2.

Turning now to FIG. 21, another embodiment of the transmit electrode set 80 and the receive electrode set 100 is shown. In this embodiment, the transmit electrode set 80 comprises a pair of coplanar concentric transmit electrodes 196 comprising an outer elliptical ring transmit electrode and an inner elliptical ring transmit electrode circumscribed by the outer elliptical ring transmit electrode. The receive electrode set comprises a pair of arcuate receive electrodes 198 comprising an outer arcuate receive electrode and an inner arcuate receive electrode. The outer arcuate receive electrode is dimensioned to be a segment of the outer elliptical ring transmit electrode. The inner arcuate receive electrode is dimensioned to be a segment of the inner elliptical ring transmit electrode. While only a single pair of arcuate receive electrodes 198 has been shown, it will be appreciated that in this embodiment, multiple receive arcuate electrodes may be coupled to the same pair of concentric transmit electrodes 196. Furthermore, while the transmit electrode set 80 has been shown as comprising a pair of coplanar concentric transmit electrodes 196 and the receive electrode set 100 has been shown as comprising a pair of arcuate receive electrodes 198, it will be appreciated that this configuration may be reversed.

Turning now to FIGS. 22a to 22d, other embodiments of the transmit electrode set 80 and the receive electrode set 100 are shown. In the embodiment shown in FIG. 22a, the transmit electrode set 80 comprises a pair of coplanar concentric electrodes 200 comprising an outer circular ring transmit electrode and an inner circular ring transmit electrode circumscribed by the outer circular ring transmit electrode. Each circular ring transmit electrode is defined by a toroid generated by revolving a rectangle. In this embodiment, the receive electrode set 100 is identical to the transmit electrode set 80.

Figure 22C:
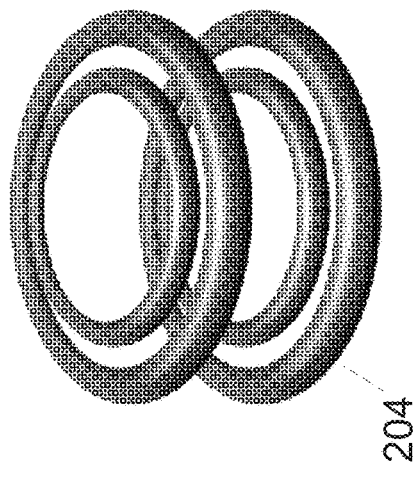
FIG. 22c is a perspective view of another embodiment of the electrodes of the system of FIG. 2.
Figure 22D:
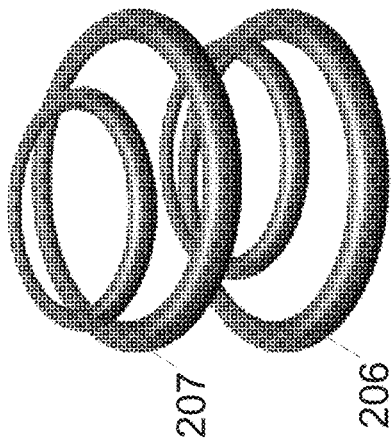
FIG. 22d is a perspective view of another embodiment of the electrodes of the system of FIG. 2.
Figure 22A:
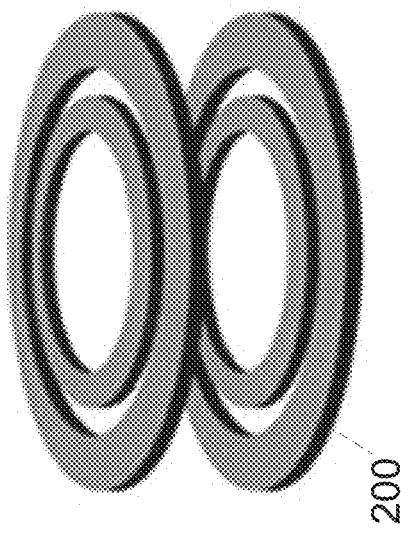
FIG. 22a is a perspective view of another embodiment of the electrodes of the system of FIG. 2.
Figure 22B:
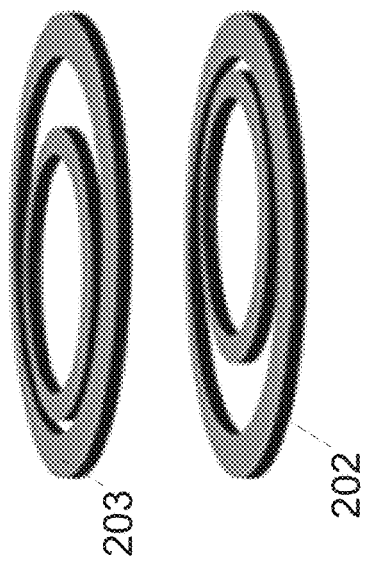
FIG. 22b is a perspective view of another embodiment of the electrodes of the system of FIG. 2.

In the embodiment shown in FIG. 22b, the transmit electrode set 80 comprises a pair of concentric transmit electrodes 202 comprising an outer elliptical ring transmit electrode and an inner elliptical ring transmit electrode that do not have a common central axis. The inner elliptical ring transmit electrode is circumscribed by the outer elliptical ring transmit electrode. Each elliptical ring transmit electrode is defined by a toroid generated by revolving a rectangle. The receive electrode set 100 comprises a pair of concentric receive electrodes 203 comprising an outer elliptical ring receive electrode and an inner elliptical ring receive electrode that do not have a common central axis. The inner elliptical ring receive electrode is circumscribed by the outer elliptical ring receive electrode. Each elliptical ring receive electrode is defined by a toroid generated by revolving a rectangle.

In the embodiment shown in FIG. 22c, the transmit electrode set 80 comprises a pair of concentric coplanar electrodes 204 comprising an outer circular ring transmit electrode and an inner circular ring transmit electrode circumscribed by the outer circular ring transmit electrode. Each circular ring transmit electrode is defined by a toroid generated by revolving a circle (i.e. a torus). In this embodiment, the receive electrode set 100 is identical to the transmit electrode set 80.

In the embodiment shown in FIG. 22d, the transmit electrode set 80 comprises a pair of concentric transmit electrodes 206 comprising an outer circular ring transmit electrode and an inner circular ring transmit electrode that do not have a common central axis. The inner circular ring transmit electrode is circumscribed by the projection of the outer circular ring transmit electrode along the z axis. Each circular ring transmit electrode is defined by a toroid generated by revolving a circle (i.e. a torus). The receive electrode set 100 comprises of concentric receive electrodes 207 comprising an outer circular ring receive electrode and an inner circular ring receive electrode that do not have a common central axis. The inner circular ring receive electrode is circumscribed by the projection of the outer circular ring receive electrode along the z axis. Each circular ring receive electrode is defined by a toroid generated by revolving a circle (i.e. a torus).

Figure 23B:
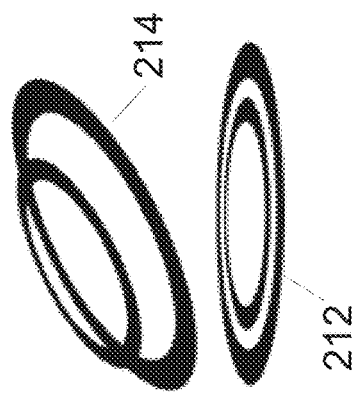
FIG. 23b is a perspective view of another embodiment of the electrodes of the system of FIG. 2.
Figure 23C:
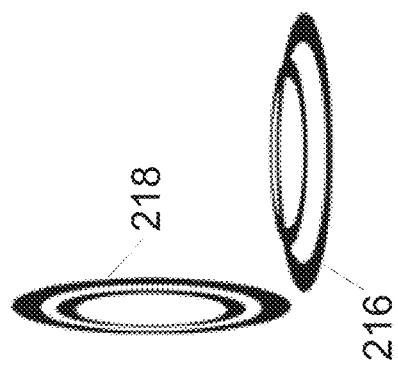
FIG. 23c is a perspective view of another embodiment of the electrodes of the system of FIG. 2.
Figure 23A:
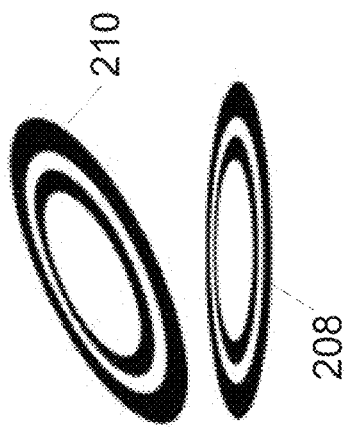
FIG. 23a is a perspective view of another embodiment of the electrodes of the system of FIG. 2.

Turning now to FIGS. 23a to 23c, other embodiments of the transmit electrode set 80 and the receive electrode set 100 are shown In the embodiment shown in FIG. 23a, the transmit electrode set 80 comprises a pair of concentric transmit electrodes 208 comprising an outer elliptical ring transmit electrode and an inner elliptical ring transmit electrode circumscribed by the outer elliptical ring transmit electrode. The receive electrode set 100 comprises a pair of concentric receive electrodes 210 comprising an outer elliptical ring receive electrode and an inner elliptical ring receive electrode circumscribed by the outer elliptical ring receive electrode. The angle between the plane of the transmit electrode set 80 and the plane of the receive electrode set 100 is approximately 45 (forty-five) degrees.

Turning now to FIG. 23b, the transmit electrode set 80 comprises a pair of concentric transmit electrodes 212 comprising an outer elliptical ring transmit electrode and an inner elliptical ring transmit electrode circumscribed by the outer elliptical ring transmit electrode. The receive electrode set 100 comprises a pair of concentric non-coplanar receive electrodes 214 comprising an outer elliptical ring receive electrode and an inner elliptical ring receive electrode circumscribed by the projection of the outer elliptical ring receive electrode. The angle between the plane defined of the transmit electrode set 80 and the plane of the receive electrode set 100 is approximately 45 (forty-five) degrees.

Turning now to FIG. 23c, the transmit electrode set 80 comprises a pair of concentric non-coplanar transmit electrodes 216 comprising an outer elliptical ring transmit electrode and an inner elliptical ring transmit electrode circumscribed by the projection of the outer elliptical ring transmit electrode along the z axis. The receive electrode set 100 comprises a pair of concentric coplanar receive electrodes 218 comprising an outer elliptical ring receive electrode and an inner elliptical ring receive electrode circumscribed by the outer elliptical ring receive electrode. The angle between the plane of the transmit electrode set 80 and the plane of the receive electrode set 100 is approximately 90 (ninety) degrees. While the transmit electrode set 80 and the receive electrode 100 have been shown as specific angle, it will be appreciated that other angles are possible.

Figure 24B:
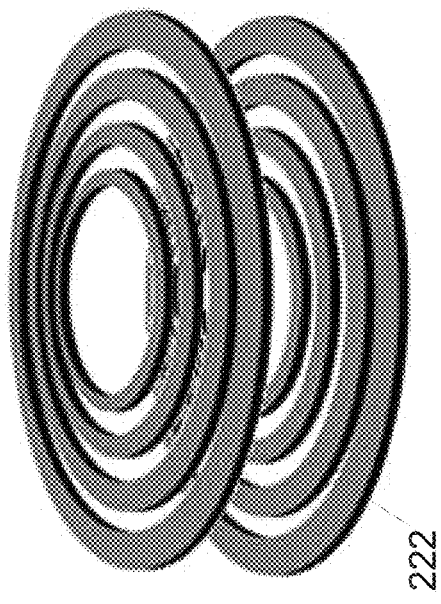
FIG. 24b is a perspective view of another embodiment of the electrodes of the system of FIG. 2.
Figure 24C:
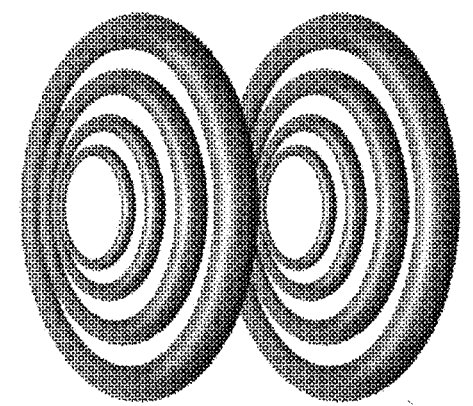
FIG. 24c is a perspective view of another embodiment of the electrodes of the system of FIG. 2.
Figure 24A:
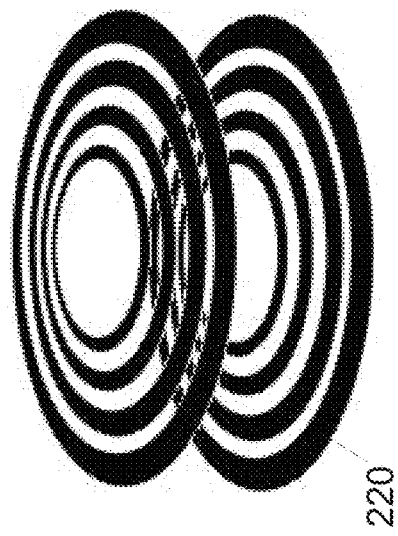
FIG. 24a is a perspective view of another embodiment of the electrodes of the system of FIG. 2.

Turning now to FIGS. 24a to 24c, other embodiments of the transmit electrode set 80 and the receive electrode set 100 are shown. In the embodiment shown in FIG. 24a, the transmit electrode set 80 comprises four coplanar concentric circular ring transmit electrodes 220. Alternating ring transmit electrodes are shorted together. In this embodiment, the receive electrode set 100 is identical to the transmit electrode set 80.

In the embodiment shown in FIG. 24b, the transmit electrode set 80 comprises four coplanar concentric circular ring transmit electrodes 222. Alternating ring transmit electrodes are shorted together. Each ring transmit electrode is a toroid generated by a revolving a rectangle. In this embodiment, the receive electrode set 100 is identical to the transmit electrode set 80.

In the embodiment shown in FIG. 24c, the transmit electrode set 80 comprises four coplanar concentric circular transmit electrodes 224. Alternating ring transmit electrodes are shorted together. Each ring transmit electrode is a toroid generated by a revolving a circle (i.e. a torus). In this embodiment, the receive electrode set 100 is identical to the transmit electrode set 80.

Two of the coplanar concentric circular ring transmit electrodes 220 and two of the coplanar concentric circular ring transmit electrodes 222 may function as a backup set of electrodes.

While embodiments have been described where the electrode set 80 and 100 comprises four electrodes, it will be appreciated that the electrode sets 80 and 100 may comprise three or more electrodes.

Figure 25A:
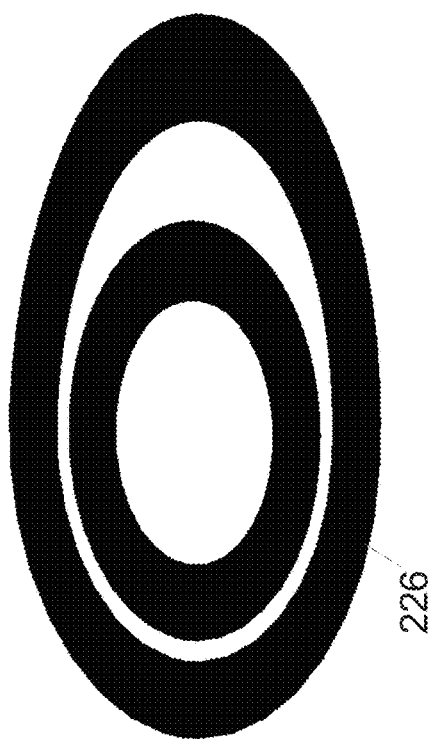
FIG. 25a is a plan view of another embodiment of the electrodes of the system of FIG. 2.
Figure 25B:
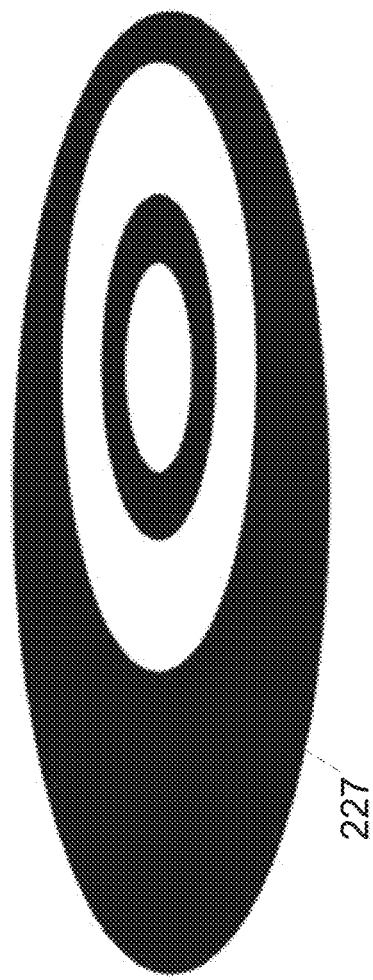
FIG. 25b is a plan view of another embodiment of the electrodes of the system of FIG. 2.

Turning now to FIGS. 25a and 25b, other embodiments of the transmit electrode set 80 are shown. In the embodiment shown in FIG. 25a, the transmit electrode set 80 comprises a pair of coplanar concentric electrodes 226 comprising an outer elliptical ring transmit electrode and an inner elliptical ring transmit electrode circumscribed by the outer ring transmit elliptical electrode. The outer elliptical ring transmit electrode and the inner elliptical ring transmit electrode are azimuthally asymmetric. In this embodiment, the resonant electric field coupling varies with rotation angle resulting in modulation in the power extracted by the receiver 90 at the rotation frequency. This creates waveforms at the rotation frequency. As previously described, the power modulation may be, at least partially, eliminated with the tuning/matching network of the RF-DC rectifier 96 that compensates for the change in coupling strength based on the angular position. Off axis rotation causes variation in the mutual capacitance of the system 70 which causes a change in impedance which is compensated for by the tuning/matching network of the RF-DC rectifier 96. The RF-DC rectifier may 96 further include a band pass filter to filter out low frequency modulation and average the extracted power of the period of rotation which may result in a drop in power extracted, that may result in decreased power transfer efficiency. While the transmit electrode set 80 has been shown as comprising the concentric electrodes 226, it will be appreciated that the receive electrode set 100 may be identically configured.

In the embodiment shown in FIG. 25b, the transmit electrode 80 comprises a pair of concentric coplanar electrodes 227 comprising an outer elliptical ring transmit electrode and an inner elliptical ring transmit electrode circumscribed by the outer elliptical ring transmit electrode. The outer elliptical ring transmit electrode and the inner elliptical ring transmit electrode are azimuthally asymmetric. In this embodiment, the resonant electric field coupling varies with rotation angle resulting in modulation in the power extracted by the receiver 90 at the rotation frequency. This creates waveforms at the rotation frequency. As previously described, the power modulation may be, at least partially, eliminated with the tuning/matching network of the RF-DC rectifier 96 that compensates for the change in coupling strength based on the angular position. Off axis rotation causes variation in the mutual capacitance of the system 70 which causes a change in impedance which is compensated for by the tuning/matching network of the RF-DC rectifier 96. The RF-DC rectifier may 96 further include a band pass filter to filter out low frequency modulation and average the extracted power of the period of rotation which may result in a drop in power extracted, that may result in decreased power transfer efficiency. While the transmit electrode set 80 has been shown as comprising the concentric electrodes 227, it will be appreciated that the receive electrode set 100 may be identically configured.

Figure 26A:
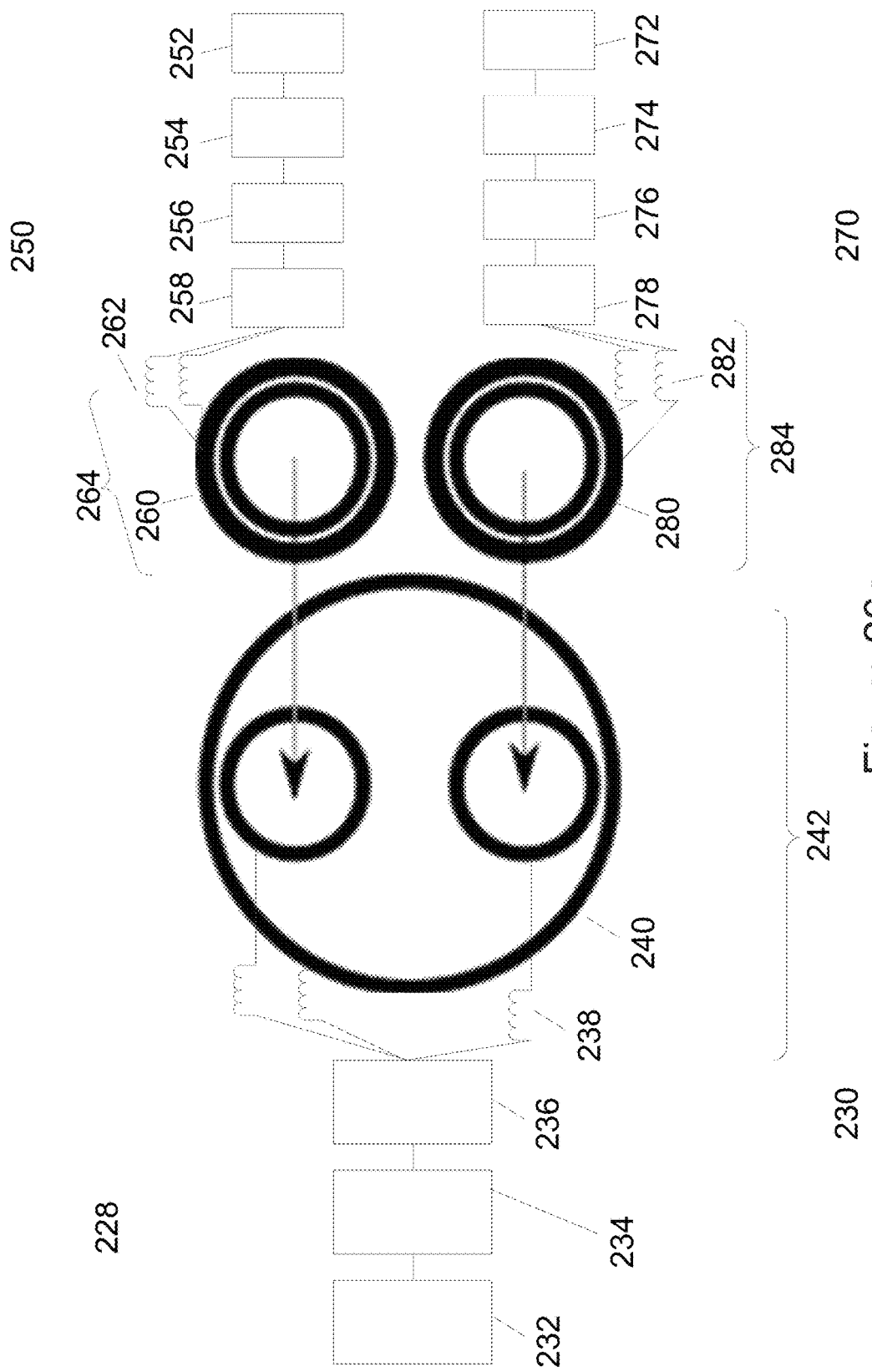
FIG. 26a is a schematic layout view of another embodiment of a wireless resonant electric field power transfer system.

Turning now to FIG. 26a, another embodiment of a wireless power transfer system 228 is shown. In this embodiment, the wireless power transfer system 228 comprises a transmitter 230, a first receiver 250 and a second receiver 270. The transmitter 230 comprises a power source 232 electrically connected to a power inverter 234, which in turn is electrically connected across an inductive transmit balun 236. The inductive transmit balun 236 interconnects unbalanced and balanced systems and performs impedance transformation. The transmitter 230 further comprises a transmit electrode set 240 electrically connected to the inductive transmit balun 236 via series high Q transmit inductors 238.

The transmit electrode set 240 comprises three coplanar concentric capacitive transmit electrodes. In this embodiment, the capacitive transmit electrodes comprise an outer circular ring transmit electrode and a pair of laterally spaced inner circular ring transmit electrodes. The inner circular ring transmit electrodes are circumscribed by the outer circular ring transmit electrode. Each capacitive transmit electrode in the transmit electrode set 240 is connected to the inductive transmit balun 236 via one of the high Q transmit inductors 238. The capacitive transmit electrodes of the transmit electrode set 240 are resonated with the series high Q transmit inductors 238 at a particular operating frequency to form a transmit resonator 242.

The first receiver 250 comprises a load 252 electrically connected to a regulator 254, which in turn is electrically connected to a radio-frequency to direct current (RF-DC) rectifier 256. In this embodiment, the RF-DC rectifier 256 employs ultra-fast diodes that have a low junction capacitive, a high reverse breakdown voltage and a low forward voltage drop. The RF-DC rectifier 256 may also employ synchronous MOSFETs (metal-oxide-semiconductor field-effect transistors). The RF-DC rectifier 256 includes a tuning/matching network. The RF-DC 256 rectifier is electrically connected across an inductive receive balun 258. Similar to the inductive transmit balun 238, the inductive receive balun 258 interconnects unbalanced and balanced systems and performs impedance transformation. The first receiver 250 further comprises an electrode set 260 electrically connected to the inductive receive balun 258 via series high Q receive inductors 262. The electrode set 260 comprises a pair of concentric capacitive receive electrodes comprising an inner circular ring receive electrode and an outer circular ring receive electrode circumscribing the inner circular ring receive electrode. Each capacitive receive electrode in the electrode set 260 is connected to the inductive receive balun 258 via one of the high Q receive inductors 262. The capacitive receive electrodes of the electrode set 260 are resonated with the series high Q receive inductors 262 at the same operating frequency as the transmit resonator 242 to form a first receive resonator 264.

The second receiver 270 comprises a load 272 electrically connected to a regulator 274, which in turn is electrically connected to a radio-frequency to direct current (RF-DC) rectifier 276. In this embodiment, the RF-DC rectifier 276 employs ultra-fast diodes that have a low junction capacitive, a high reverse breakdown voltage and a low forward voltage drop. The RF-DC rectifier 276 may also employ synchronous MOSFETs (metal-oxide-semiconductor field-effect transistors). The RF-DC rectifier 276 includes a tuning/matching network. The RF-DC 276 rectifier is electrically connected across an inductive receive balun 278. Similar to the inductive transmit balun 278, the inductive receive balun 278 interconnects unbalanced and balanced systems and performs impedance transformation. The second receiver 270 further comprises an electrode set 280 electrically connected to the inductive receive balun 278 via series high Q receive inductors 282. The electrode set 280 comprises a pair of concentric capacitive receive electrodes comprising an inner circular ring receive electrode and an outer circular ring receive electrode circumscribing the inner circular ring receive electrode. Each capacitive receive electrode in the electrode set 280 is connected to the inductive receive balun 278 via one of the high Q receive inductors 282. The capacitive receive electrodes of the electrode set 280 are resonated with the series high Q receive inductors 282 at the same operating frequency as the transmit resonator 242 to form a second receive resonator 284.

During operation, power is transferred from the power source 232 to the power inverter 234. The power inverter 234 outputs an RF signal at the operating frequency that excites the transmit resonator 242 via the inductive transmit balun 236 causing the transmit resonator 242 to generate an alternating resonant electric field. When the first receiver 250 is placed within the resonant electric field, the first receive resonator 264 extracts power from the transmitter 230 via resonant electric field coupling. The power transferred to the first receive resonator 264 is then transferred to the RF-DC rectifier 256 via the inductive receive balun 258 where the power is rectified. The rectified power is then transferred to the regulator 254 which regulated the power. The regulated power is then applied to the load 252. The tuning/matching network of the RF-DC rectifier 256 ensures that the transmit resonator 242 and the first receive resonator 264 are critically coupled.

Similarly, when the second receiver 270 is placed within the electric field, the second receive resonator 284 extracts power from the transmitter 230 via resonant electric field coupling. The power transferred to the second receive resonator 284 is then transferred to the RF-DC rectifier 276 via the inductive receive balun 278 where the power is rectified. The rectified power is then transferred to the regulator 274 which regulated the power. The regulated power is then applied to the load 272. The tuning/matching network of the RF-DC rectifier 276 ensures that the transmit resonator 242 and the second receive resonator 284 are critically coupled.

Turning now to FIG. 26b, another embodiment of the transmit electrode set 240 and the first receive electrode set 260 and the second receive electrode set 280 is shown. In this embodiment, the transmit electrode set 260 comprises three electrodes comprising an outer plate electrode 290 having two circular apertures formed therein, a first inner circular ring transmit electrode 292 positioned within the first aperture of the outer plate electrode 290, and a second transmit inner ring transmit electrode 294 positioned within the second aperture of the outer plate electrode 290.

The first receive electrode set 260 comprises a pair of coplanar concentric electrodes 296 comprising an outer circular ring receive electrode and an inner circular ring receive electrode circumscribed by the outer circular ring receive electrode. The second receive electrode set 280 comprises a pair of coplanar concentric electrodes 298 comprising an outer circular ring receive electrode and an inner circular ring receive electrode circumscribed by the outer circular ring receive electrode.

Figure 27A:
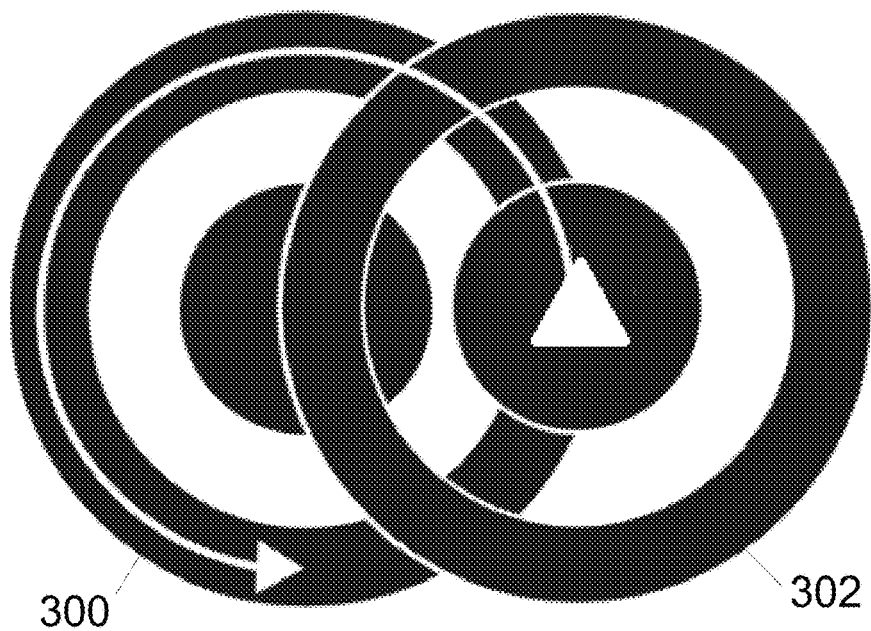
FIG. 27a is a plan view of another embodiment of the electrodes of the system of FIG. 2.
Figure 27B:
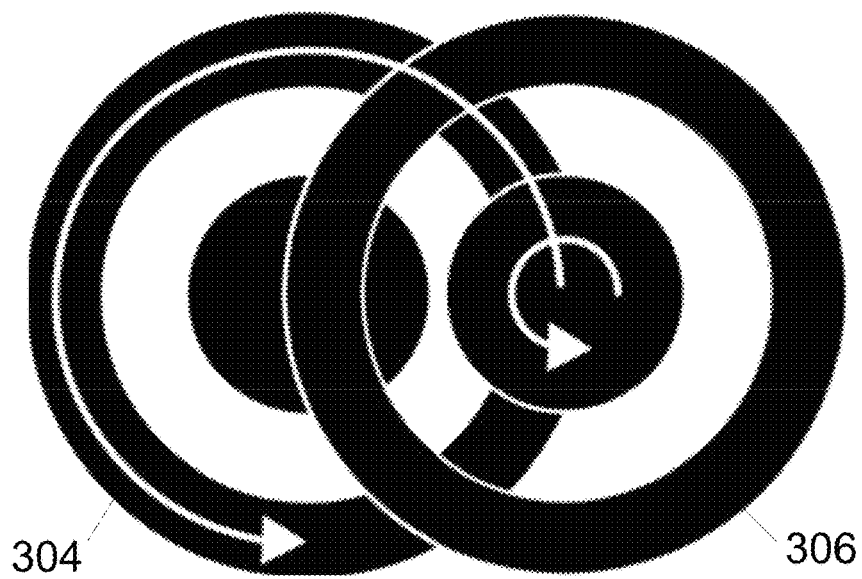
FIG. 27b is a plan view of another embodiment of the electrodes of the system of FIG. 2.

Turning now to FIGS. 27a and 27b, other embodiments of the transmit electrode set 80 and the receive electrode set 100 of the system 70 are shown. In the embodiment shown in FIG. 27a, the transmit electrode set 80 comprises a pair of concentric transmit electrodes 300 comprising an outer ring transmit electrode and an inner ring transmit electrode in the form of a disc (i.e. having an $r_{in}$ of zero). The receive electrode set 100 similarly comprises a pair of concentric receive electrodes 302 comprising an outer ring receive electrode and an inner ring receive electrode in the form of a disc (i.e. having an $r_{in}$ of zero). As can be seen, the receive electrodes 302 are axially offset from the transmit electrodes 300. In this embodiment, the receive electrodes 302 rotate about the z axis of the transmit electrodes 300. The effects of this off-axis aligned are discussed in reference to FIGS. 8a to 8d.

In the embodiment shown in FIG. 27b, the transmit electrode set 80 comprises a pair of concentric transmit electrodes 304 comprising an outer circular ring transmit electrode and an inner circular transmit electrode in the form of a disc (i.e. having an $r_{in}$ of zero). The receive electrode set 100 similarly comprises a pair of concentric receive electrodes 306 comprising an outer circular ring receive electrode and an inner circular receive electrode in the form of a disc (i.e. having an $r_{in}$ of zero). As can be seen, the receive electrodes 306 are axially offset from the transmit electrodes 304. Furthermore, in this embodiment, the receive electrodes 306 rotate about the z axis of the transmit electrodes 304 and about the z axis of the receive electrodes 306. The effects of this off-axis aligned are discussed in reference to FIGS. 8a to 8d.

Figure 28B:
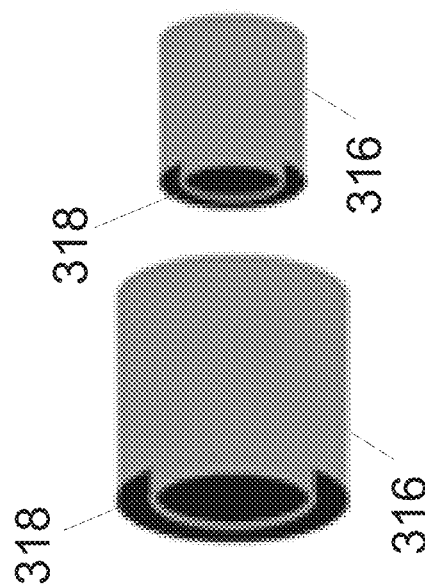
FIG. 28b is a perspective view of another embodiment of the electrodes of the system of FIG. 2.
Figure 28A:
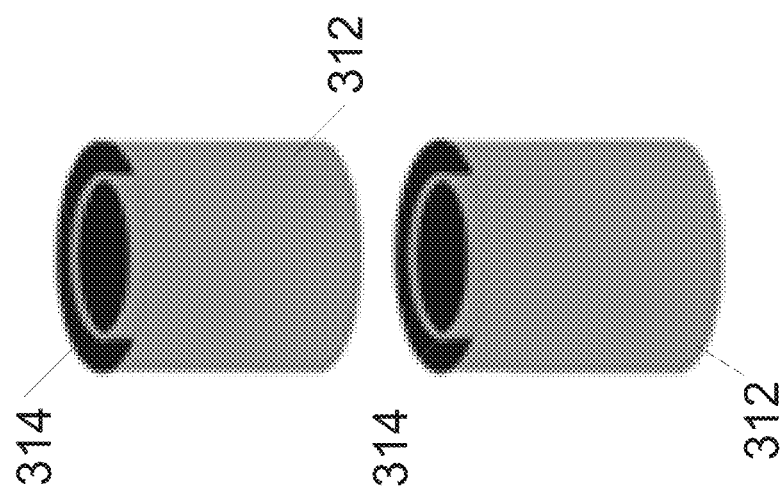
FIG. 28a is a perspective view of another embodiment of the electrodes of the system of FIG. 2.

Turning now to FIGS. 28a and 28b, other embodiments of the transmit electrode set 80 and the receive electrode set 100 are shown. In the embodiment shown in FIG. 28a, the transmit electrode set 80 comprises a pair of concentric transmit electrodes 312 comprising a first outer cylindrical transmit electrode and a second outer cylindrical transmit electrode having identical radii (i.e. $r_{in}=R_{in}$ and $r_{out}=R_{out}$). The receive electrode set 100 similarly comprises a pair of concentric receive electrodes 314 comprising a first inner cylindrical receive electrode and a second inner cylindrical receive electrode having identical radii (i.e. $r_{in}=R_{in}$ and $r_{out}=R_{out}$). Each receive electrode 314 is positioned within a corresponding transmit electrode 312. The increased surface area of the concentric transmit and receive electrodes 312 and 314 relative to the transmit and electrode sets 80 and 100 of FIG. 2 result in an increased capacitance as surface area is proportional to capacitance. Furthermore, since the operating frequency is inversely proportional to the square of the capacitance, the increased capacitance decreases the operating frequency. This may be particularly beneficial for electronics.

In the embodiment shown in FIG. 28b, the transmit electrode set 80 comprises a pair of concentric transmit electrodes 316 comprising a first outer cylindrical transmit electrode and a second outer cylindrical transmit electrode having non-identical radii. The receive electrode set 100 comprises a pair of concentric receive electrodes 318 comprising a first inner cylindrical receive electrode and a second inner cylindrical receive electrode having non-identical radii. Each receive electrode 318 is positioned within a corresponding transmit electrode 316. While the transmit electrode set 80 has been described as comprising concentric transmit electrodes 316 and the receive electrode set 100 has been described as comprising concentric receive electrodes 318 with non-identical radii, it will be appreciated that this configuration may be reversed.

Figure 29:
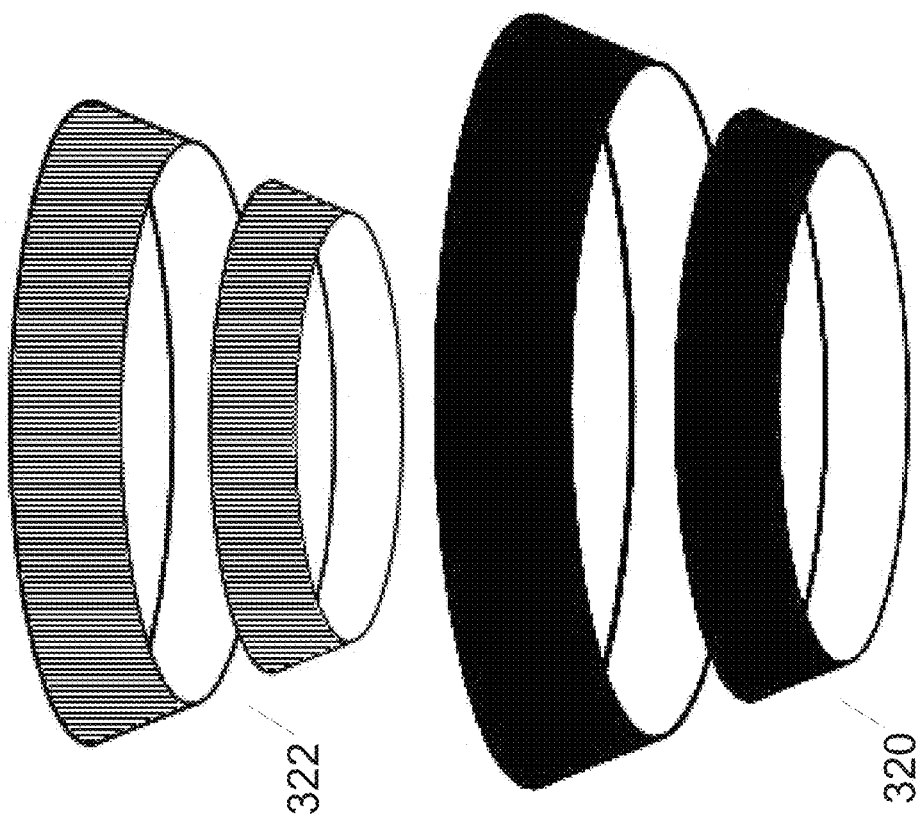
FIG. 29 is a perspective view of another embodiment of the electrodes of the system of FIG. 2.

Turning now to FIG. 29, another embodiment of the transmit electrode set 80 and the receive electrode set 100 is shown. In this embodiment, the transmit electrode set 80 comprises a pair of non-coplanar concentric transmit electrodes 320 comprising an outer frustum transmit electrode and an inner frustum transmit electrode circumscribed by a projection of the outer frustum transmit electrode along the z axis. The receive electrode set comprises a pair of non-coplanar concentric receive electrodes 322 comprising an outer frustum receive electrode and an inner frustum receive electrode circumscribed by a projection of the outer frustum receive electrode along the z axis. The cone defined by the receive electrodes 322 is smaller than the cone defined by the transmit electrodes 320.

Turning now to FIGS. 30a to 30c, another embodiment of the transmit electrode set 80 and receive electrode set 100 is shown. In this embodiment, the transmit electrode set 80 comprises a pair of concentric transmit electrodes comprising a hollow tube 330 and a rod 332. The receive electrode set 100 comprises a pair of concentric receive electrodes comprising an inner hollow tube 334 and an outer hollow tube 336. The hollow tube 330 encompasses the inner and outer hollow tubes 334 and 336, and the rod 332 of such that there are gaps between the rod 332 and the inner tube 334, the inner tube 334 and the outer tube 336, and the outer tube 336 and the hollow tube 330. In this embodiment, the rod 332 is solid; however, one of skill in the art will appreciate that the rod 332 may be hollow. The capacitance between the hollow tube 330 and the rod 332 is small because the inner and outer tubes 334 and 336 lie between the hollow tube 330 and the rod 332. To at least partially alleviate this issue, the hollow tube 330 has a varying diameter such that it is in close proximity to the outer tube 336 at one end encompassing the outer tube 336, inner tube 334, and rod, and then tapers as the hollow tube 330 extends past the inner and outer tubes 334 and 336 to come closer to the rod 332. As the diameter of the hollow tube 330 decreases and the inner and outer tubes 334 and 336 are no longer between the hollow tube 300 and the rod 302, the capacitance between the hollow tube 330 and the rod 302 increases.

While the transmit electrode set 80 has been described as comprising concentric transmit electrodes comprising a hollow tube 330 and a rod 332 and the receive electrode set 100 has been described as comprising concentric receive electrodes comprising an inner hollow tube 334 and an outer hollow tube 336, it will be appreciated that this configuration may be reversed.

Figure 31B:
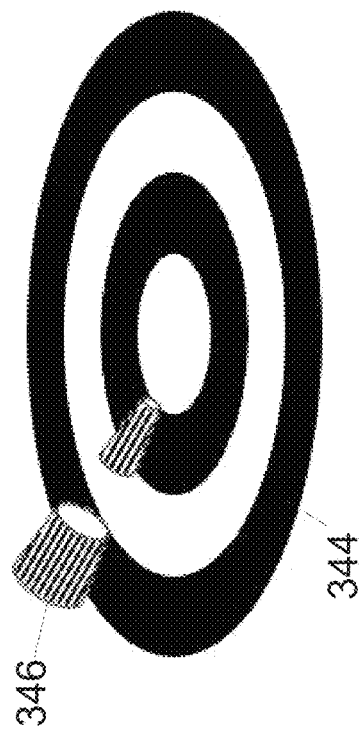
FIG. 31b is a perspective view of another embodiment of the electrodes of the system of FIG. 2.
Figure 31A:
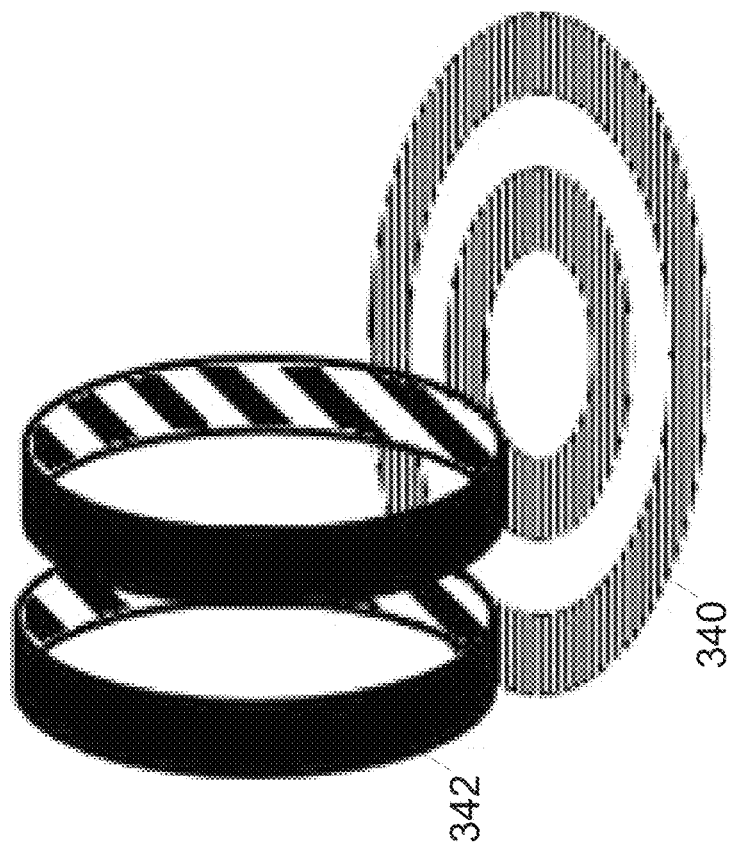
FIG. 31a is a perspective view of another embodiment of the electrodes of the system of FIG. 2.

Turning now to FIGS. 31a and 31b, other embodiments of the transmit electrode set 80 and the receive electrode set 100 are shown. In the embodiment shown in FIG. 31a, the transmit electrode set 80 comprises a pair of concentric transmit electrodes 340 comprising an outer circular ring transmit electrode and an inner circular ring transmit electrode circumscribed by the outer circular ring transmit electrode. The receive electrode set 100 comprises a pair of concentric receive electrodes 342 comprising an outer circular ring receive electrode and an inner circular ring receive electrode having identical radii (i.e. $r_{in}=R_{in}$ and $r_{out}=R_{out}$). The receive electrodes 342 are at a 90 degree angle (rotated about the r axis) to the transmit electrodes 342. The receive electrodes 342 have an additional axis of rotational freedom, which can be any axis that is perpendicular to the z axis. Numerous pairs of receive electrodes 342 can rotate in the z axis around the same pair of transmit electrodes 340.

While the transmit electrode set 80 has been described as comprising concentric transmit electrodes 340 and the receive electrode set 100 has been described as comprising concentric receive electrodes 342 at a 90 degree angle to the transmit electrodes 340, it will be appreciated that this configuration may be reversed.

In the embodiment shown in FIG. 31b, the transmit electrode set 80 comprises a pair of concentric transmit electrodes 344 comprising an outer circular ring transmit electrode and an inner circular ring transmit electrode circumscribed by the outer circular ring transmit electrode. The receive electrode set 100 comprises a pair of concentric receive electrodes 346 comprising an outer frustum receive electrode and an inner frustum receive electrode circumscribed by a projection of the outer frustum receive electrode along the z axis. The receive electrodes 346 are rotated relative to the transmit electrodes about the r axis, and can rotate about their center of curvature without varying the coupling strength. Similar to the embodiment shown in FIG. 31a, additional receive electrodes 346 can rotate in the z axis around the same pair of transmit electrodes 344.

Figure 32:
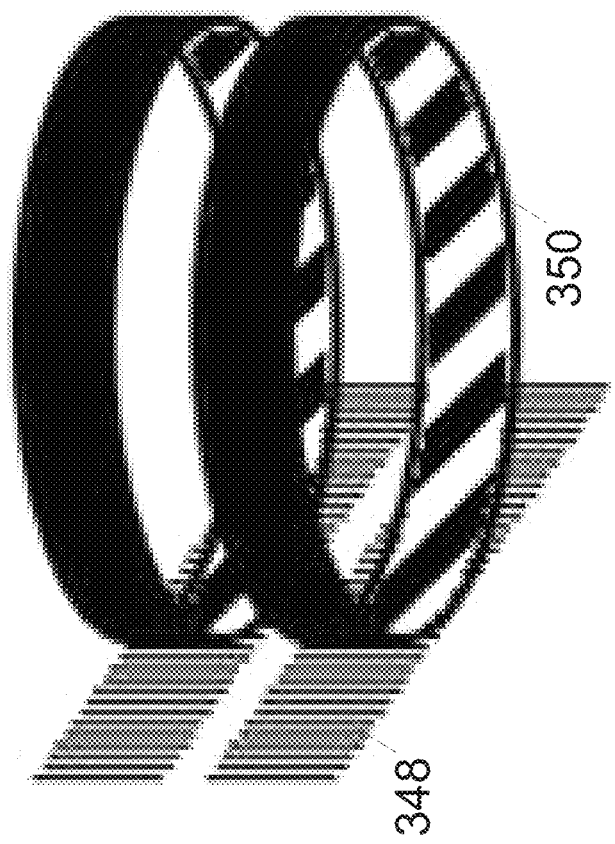
FIG. 32 is a perspective view on another embodiment of the electrodes in the system of FIG. 2.

Turning now to FIG. 32, another embodiment of the transmit electrode set 80 and the receive electrode set 100 is shown. In this embodiment, the transmit electrode set 80 comprises a pair of parallel spaced elongate plate transmit electrodes 348. The receive electrode set 100 comprises a pair of concentric receive electrodes 350 comprising an outer circular ring receive electrode and an inner circular ring receive electrode having identical radii (i.e. $r_{in}=R_{in}$ and $r_{out}=R_{out}$). The receive electrodes 350 are at a 90 degree angle (rotated about the z axis) to the transmit plate electrodes 348.

Turning now to FIGS. 33a to 33e, another embodiment of the transmit electrode set 80 and the receive electrode set 100 is shown. In this embodiment, the transmit electrode set 80 comprises a pair of concentric transmit electrodes comprising a first socket electrode 352 and a second socket electrode 354. The first and second socket electrodes 352 and 354 are separated by an insulator 356 which, in this embodiment, is an insulating solid dielectric. Each socket electrode 352 and 354 is connected to a high Q transmit inductor 82 of the system 70 by a feed line 358. The coaxial feed lines 358 are separated by an insulating material 360. As shown in FIGS. 33d and 33e, the first and second socket electrodes 352 and 354 may be enclosed in an outer casing 362.

The receive electrode set 100 comprises a pair of concentric receive electrodes comprising a first ball electrode 364 and a second ball electrode 366 located within the socket electrodes 352 and 354. The first and second ball electrodes 364 and 366 are not electrically connected. In this embodiment, the first and second ball electrodes 364 and 366 are separated by an insulating fluid 368. The ball electrodes 364 and 366 are coated with an insulating material to prevent shorts from movement of the ball electrodes 364 and 366 through the insulating fluid 368. Each ball electrode 334 and 366 is connected to a high Q receive inductor 102 of the system 70 by a feed line 370. The two coaxial feed lines 370 are separated by an insulating material 372. The opening in the first socket electrode 352 permits pivoting of the first and second ball electrodes 364 and 366 within the first socket electrode 352. The first and second ball electrodes 364 and 366 are free to rotate about their z axis.

While the transmit electrode set 80 has been described as comprising socket electrodes 352 and 354 and the receive electrode set 100 has been described as comprising ball electrodes 364 and 366, it will be appreciated that this configuration may be reversed.

Figure 34B:
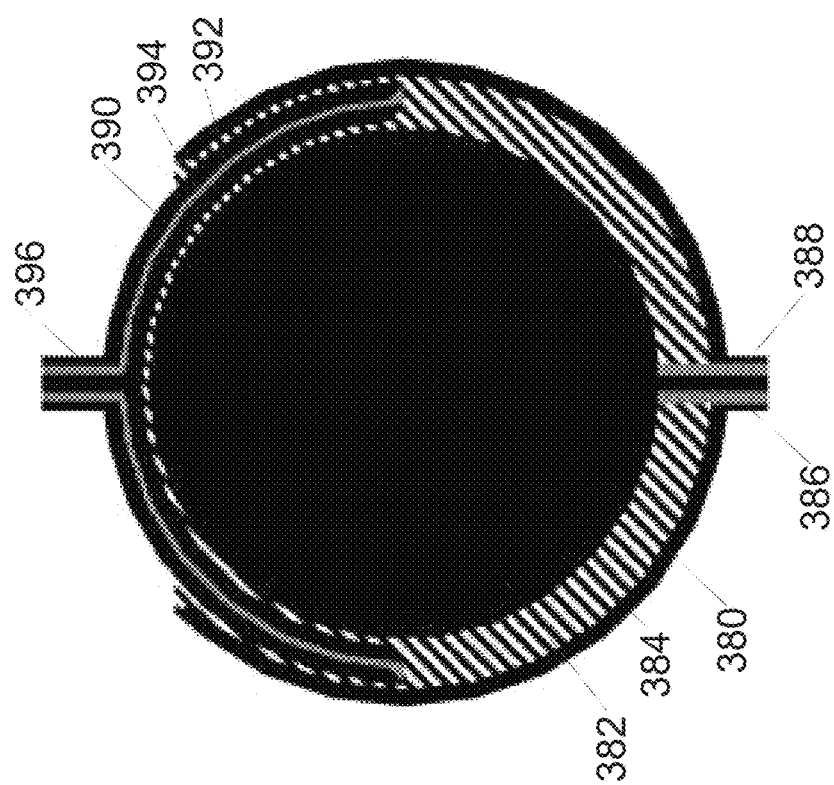
Figure 34A:
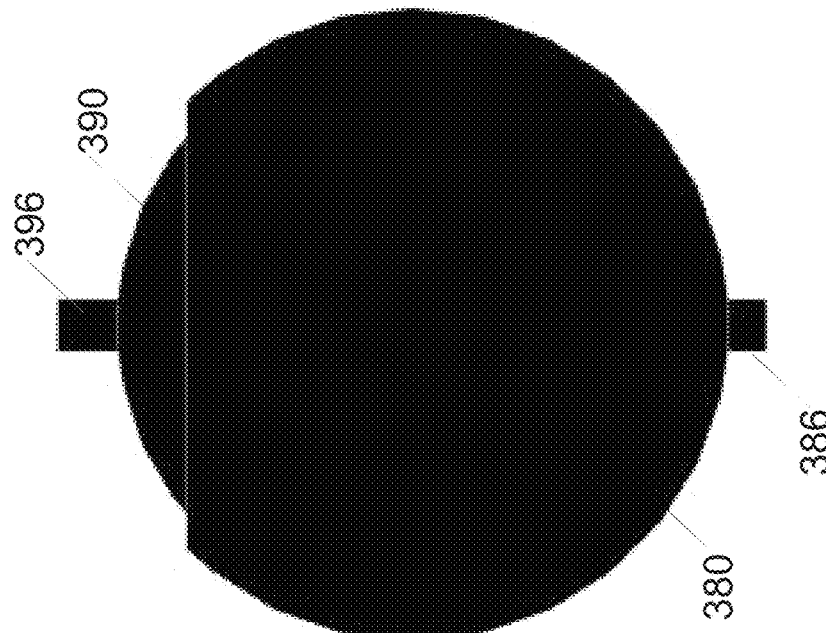
FIG. 34a is a front elevation view of another embodiment of the electrodes of the system of FIG. 2.

Turning now to FIGS. 34a and 34b another embodiment of the transmit electrode set 80 and the receive electrode set 100 is shown. In this embodiment, the transmit electrode set 80 comprises a pair of concentric transmit electrodes comprising an outer spherical electrode 380 and an inner spherical electrode 382 contained within the outer spherical electrode 380. The outer and inner spherical electrodes 380 and 382 are separated by an insulating fluid 384. The inner surface of the outer spherical electrode 380 and the outer surface of the inner spherical electrodes 382 are coated with an insulating material to prevent shorts from movement of the electrodes 380 and 382 through the insulating fluid 384. Each spherical electrode 380 and 382 may be connected to a high Q transmit inductor 82 of the system 70 by a feed line 386. The coaxial feed lines 386 are separated by an insulating material 388 which in this embodiment is an insulating solid dielectric.

The receive electrode set 100 comprises a pair of concentric receive electrode comprising a first inner spherical electrode 390 and a second inner spherical electrode 392 located partially within the outer spherical electrode 380. The first and second inner spherical electrodes 390 and 392 are separated by an insulating solid 394. Each spherical electrode 390 and 932 is connected to a high Q receive inductor 102 of the system 70 by a feed line 396. The two feed lines 396 are separated by the insulating solid 394. In this embodiment the feed lines 386 and 396 are coaxial.

While the transmit electrode set 80 has been shown as comprising the outer and inner spherical electrodes 380 and 382 and the receive electrode set 100 has been shown as comprising the first and second inner spherical electrodes 390 and 392, it will be appreciated that this may be reversed. Furthermore, while the feed lines 386 and 396 are coaxial, it will be appreciated that other types of feed lines may be used.

Figure 35:
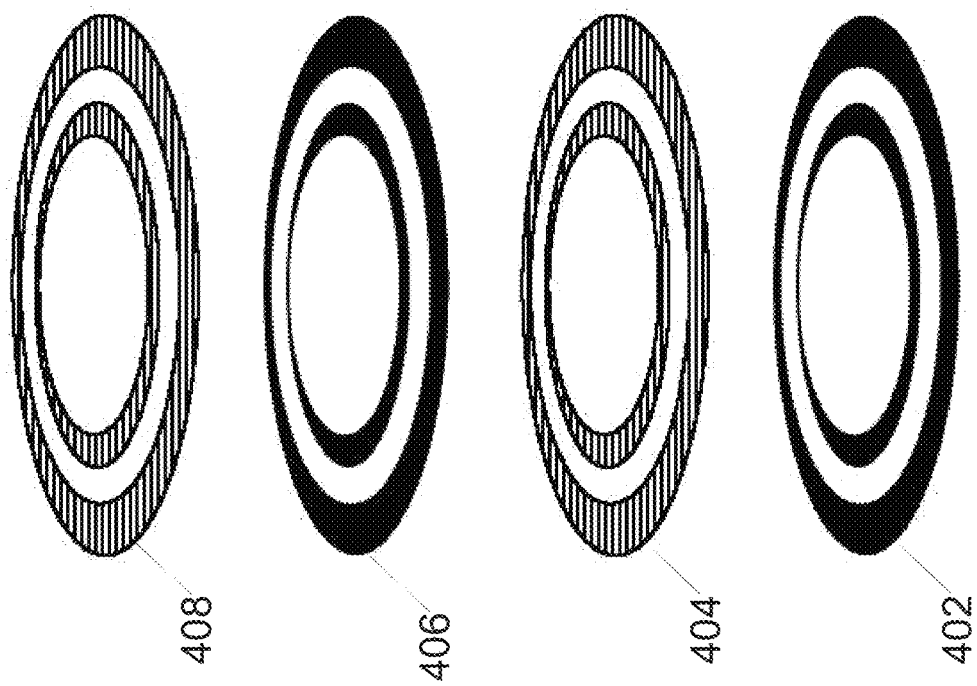
FIG. 35 is a perspective view of another embodiment of the electrodes of the system of FIG. 2.

The transmit electrode set 80 and the receive electrode set 100 may comprise multiple stacks of electrodes. For example, as shown in FIG. 35, the transmit electrode set 80 comprises a first pair of concentric transmit electrodes 402 comprising an outer circular ring electrode and an inner circular ring electrode circumscribed by the outer circular ring electrode, and a second pair of concentric transmit electrodes 406 comprising an outer circular ring electrode and an inner circular ring electrode circumscribed by the outer circular ring electrode. Similarly, the receive electrode set 100 comprises a first pair of concentric receive electrodes 404 comprising an outer circular ring electrode and an inner circular ring electrode circumscribed by the outer circular ring electrode, and a second pair of concentric receive electrodes 408 comprising an outer circular ring electrode and an inner circular ring electrode circumscribed by the outer circular ring electrode. Power is transferred from the first pair of concentric transmit electrodes 402 to the first pair of concentric receive electrodes 404, and from the second pair of concentric transmit electrodes 406 and to the second pair of concentric receive electrodes 408.

Figure 36:
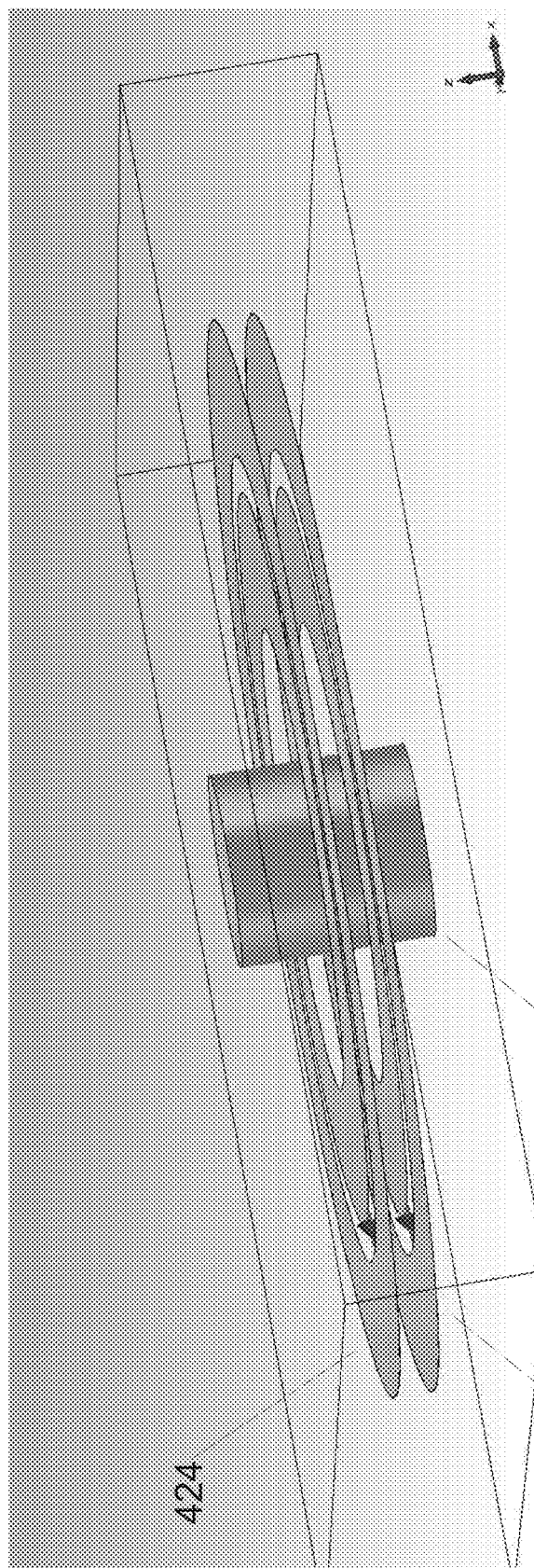
FIG. 36 is a perspective view of another embodiment of the electrodes of the system of FIG. 2.

The transmit and receive electrode sets 80 and 100 may function in a system that further an axle as shown in FIG. 36. In this embodiment, the transmit electrode set 80 comprises a pair of concentric circular ring transmit electrodes 422. The receive electrode set 100 comprises a pair of concentric circular ring receive electrodes 424. In this embodiment, the transmit and receive electrodes 422 and 424 are centered on the z-axis and the planes of the transmit and receive electrodes 422 and 424 are parallel and lie in the x-y plane. Furthermore, in this embodiment, an axle 420 is circumscribed by the transmit and receive electrodes 422 and 424 and passes through the apertures formed by the transmit and receive electrodes 422 and 424. The longitudinal axis of the axle 420 is aligned with the z axis and with the axis of rotations of the transmit and receive electrodes 422 and 424. This allows for wireless power transfer to occur at any location along the axle 420. This is especially useful when the axle 420 extends beyond the location of the power source, such as a powering electronics on top of the blades of a helicopter from the fuselage.

The axle 420 may be made of a conducting material. The radius of the axle 420 must be less than $r_{in}$ of the transmit and receive electrodes 422 and 424 such that there is a non-conducting gap isolating the transmit and receive electrodes 422 and 424 from the axle 420. The size of the non-conducting gap is such that the capacitance between the inner electrodes of the transmit and receive electrodes 422 and 424, and the axle 420 is negligible. If the capacitance between the inner electrodes of the transmit and receive electrodes 422 and 424, and the axle 420 is large, efficient power transfer will not be achieved as the potential difference between the inner electrodes of the transmit and receive electrodes 422 and 424 will be reduced.

One of skill in the art will appreciate that the various embodiments may be combined, e.g. elliptical concentric non-coplanar transmit electrodes with rectangular coplanar non-concentric segmented receive electrodes.

In one application, the power source 72 is a power source within the airframe of a helicopter. The load 92 is a one of the rotating assemblies of the helicopter. In this application the transmit electrode set 80 allows for wireless transfer of power to the receive electrode set 100. The transmit and receive electrode sets 80 and 100 electrically bridge non-rotating and rotating assemblies of the helicopter. The non-rotating and rotating assemblies may comprise: the frame, the top of the frame, the fixed swash plate, the top of the swash plate, the rotating swash plate, the tail, the mast, the radar dome, the tail rotor and the blades. Possible connections comprise: from the frame of the helicopter to the mast; from the fixed swash plate to the rotating swash plate; from the top of the frame to the segmented electrodes on the blades; from the top of the frame to a radar dome; from the top of the swash plate to radar dome; and from the tail to tail rotor.

The system may be employed in various other applications including, but not limited to: robotic arms, manufacturing rotating arms, steering columns in vehicles, rotating windmill shafts, transmitting power from the ground to a wheel of a vehicle, and transmitting power from a vehicle to an electric motor in a wheel of the vehicle.

Although embodiments have been described above with reference to the figures, those of skill in the art will appreciate that variations and modifications may be made without departing from the scope thereof as defined by the appended claims.

What is claimed is:

1. A wireless power transfer system comprising:
   a transmitter comprising a transmit electrode set configured to transfer power via resonant electric field coupling; and
   a receiver comprising a receive electrode set configured to extract the transferred power via resonant electric field coupling,
   wherein the electrodes of at least one of the transmit and/or receive electrode sets are concentric, and
   wherein at least one of the electrodes of the transmit and/or receive electrode sets are azimuthally asymmetric.

2. The wireless power transfer system of claim 1, wherein the electrodes of both the transmit and receive electrode sets are concentric.

3. The wireless power transfer system of claim 1, wherein at least one of the electrodes of the transmit and/or receive electrode sets are coplanar.

4. The wireless power transfer system of claim 1, wherein at least one of the electrodes of the transmit and/or receive electrode sets are segments of concentric electrodes.

5. The wireless power transfer system of claim 1, wherein the transmit electrode set comprises two or more concentric electrodes.

6. The wireless power transfer system of claim 1, wherein the receive electrode set comprises two or more concentric electrodes.

7. The wireless power transfer system of claim 1, wherein the electrodes of the transmit electrode set are non-coplanar and at least one electrode of the transmit electrode set overlaps at least one other electrode of the transmit electrode set, or at least one electrode of the receive electrode set overlaps at least one other electrode of the receive electrode set.

8. The wireless power transfer system of claim 1, wherein at least one electrode of the transmit electrode set and/or receive electrode set is elliptical.

9. The wireless power transfer system of claim 1, wherein at least one electrode of the transmit electrode set and/or receive electrode set is circular.

10. The wireless power transfer system of claim 1, wherein at least one electrode of the transmit electrode set and/or receive electrode set is rectangular.

11. The wireless power transfer system of claim 1, wherein at least one electrode of the transmit electrode set and/or receive electrode set is a disc.

12. The wireless power transfer system of claim 1, wherein at least one electrode of the transmit electrode set and/or receive electrode set is cylindrical.

13. The wireless power transfer system of claim 1, wherein at least one electrode of the transmit electrode set and/or receive electrode set is a ring.

14. The wireless power transfer system of claim 1, wherein at least one electrode of the transmit electrode set and/or receive electrode set is a frustum.

15. The wireless power transfer system of claim 1, wherein the transmit electrode set is axially offset from the receive electrode set.

16. The wireless power transfer system of claim 1, wherein the transmit electrode set comprises a tube and a rod, and wherein the receive electrode set comprises at least two tubes.

17. The wireless power transfer system of claim 1, wherein the electrodes of the transmitter and the electrodes of the receiver are concentric.

18. The wireless power transfer system of claim 1, further comprising:
another receiver comprising another receive electrode set configured to extract the transferred power via resonant electric field coupling.

19. The wireless power transfer system of claim 1, further comprising:
an axle circumscribed by the transmit electrode set and the receive electrode set.

20. A helicopter comprising the wireless power transfer system of claim 1.

21. The wireless power transfer system of claim 1, wherein the electrodes of the transmit and receive electrode sets are non-coaxial, wherein at least one of the transmit and/or receive electrode sets rotates about its center axis, wherein the receive electrode set rotates about the central axis of the transmit electrode set, and wherein at least one of the electrodes of the receive electrode set overlaps at least one of the electrodes of the transmit electrode set.

22. The wireless power transfer system of claim 1, wherein the transmit and/or receive electrode set comprises at least two coplanar non-coaxial inner electrodes circumscribed by a shared outer electrode, and wherein the at least two inner coplanar electrodes are non-overlapping.

23. The wireless power transfer system of claim 1, wherein the receive electrode set comprises an inner receive electrode and an outer receive electrode, and the transmit electrode set comprises an inner transmit electrode and an outer transmit electrode, wherein at least one of the receive and/or transmit electrode sets rotates about its central axis, wherein the receive electrode set is offset radially from the transmit electrode set and rotates about the central axis of the transmit electrode set, and wherein the inner receive electrode rotates along the outer transmit electrode, and wherein the outer receive electrode overlaps the inner transmit electrode.

24. A wireless power transfer system comprising:
a transmitter comprising a transmit electrode set configured to transfer power via resonant electric field coupling; and
a receiver comprising a receive electrode set configured to extract the transferred power via resonant electric field coupling,
wherein the electrodes of the transmit electrode set and/or receive electrode sets are concentric,
wherein one of the transmit and the receive electrode sets comprises a first and second socket electrode, or a first and second ball electrode,
wherein the other of the transmit and receive electrode sets comprises the other of the first and second socket electrode, or the first and second ball electrode, and
wherein at least one of the first and second ball electrode is configured to pivot within an aperture in the first and second socket electrode.

25. A wireless power transfer system comprising:
a transmitter comprising a transmit electrode set configured to transfer power via resonant electric field coupling; and
a receiver comprising a receive electrode set configured to extract the transferred power via resonant electric field coupling,
wherein the electrodes of at least one of the transmit and/or receive electrode sets are concentric,
wherein the transmit electrode set comprises an inner spherical electrode and an outer spherical electrode, and
wherein the receive electrode set is intermediate the inner spherical electrode and the outer spherical electrode.

26. A wireless power transfer system comprising:
a transmitter comprising a transmit electrode set configured to transfer power via resonant electric field coupling; and
a receiver comprising a receive electrode set configured to extract the transferred power via resonant electric field coupling,
wherein the electrodes of at least one of the transmit and/or receive electrode sets are concentric,
wherein the transmit or receive electrode sets comprise at least three parallel spaced electrodes, and
wherein the first and third electrodes are shorted together.

27. The wireless power system of claim 26, wherein at least one of the transmit and/or receive electrode sets rotates.

28. A vehicle comprising the wireless power transfer system of claim 27.

* * * * *